(12) United States Patent
Brolin et al.

(10) Patent No.: US 9,491,083 B2
(45) Date of Patent: Nov. 8, 2016

(54) SYSTEMS AND METHODS OF TEST PACKET HANDLING

(71) Applicant: Fujitsu Limited, Kawasaki (JP)

(72) Inventors: Stephen J. Brolin, Livingston, NJ (US); Ali Zaringhalam, North Caldwell, NJ (US); Frank J. Schumeg, Sandyston, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 585 days.

(21) Appl. No.: 13/691,183

(22) Filed: Nov. 30, 2012

(65) Prior Publication Data

US 2014/0153406 A1 Jun. 5, 2014

(51) Int. Cl.
*G01R 31/08* (2006.01)
*H04L 12/26* (2006.01)

(52) U.S. Cl.
CPC .................................. *H04L 43/50* (2013.01)

(58) Field of Classification Search
CPC ........................................................ H04J 3/14
USPC ........................................................ 370/241
See application file for complete search history.

(56) References Cited

U.S. PATENT DOCUMENTS

| 2001/0002476 | A1* | 5/2001 | Abdat | 711/108 |
| 2004/0082364 | A1* | 4/2004 | Kitazawa et al. | 455/560 |
| 2011/0279258 | A1* | 11/2011 | Unger et al. | 340/501 |

OTHER PUBLICATIONS

U.S. Appl. No. 13/678,312; pp. 33, filed Nov. 15, 2012.

* cited by examiner

*Primary Examiner* — Samina Choudhry
(74) *Attorney, Agent, or Firm* — Baker Botts L.L.P.

(57) ABSTRACT

The present disclosure may include a method of handling test packets in an apparatus with a first unit communicatively coupled with a second unit. The method may comprise designating a test packet with type information, the type information indicating whether the test packet is handled by the first unit, the second unit, or either unit. The method additionally may include setting one or more bits of a register of the first unit to select whether the first unit will handle all of the test packets with type information designating either unit. The disclosure further includes associated systems and apparatuses.

13 Claims, 15 Drawing Sheets

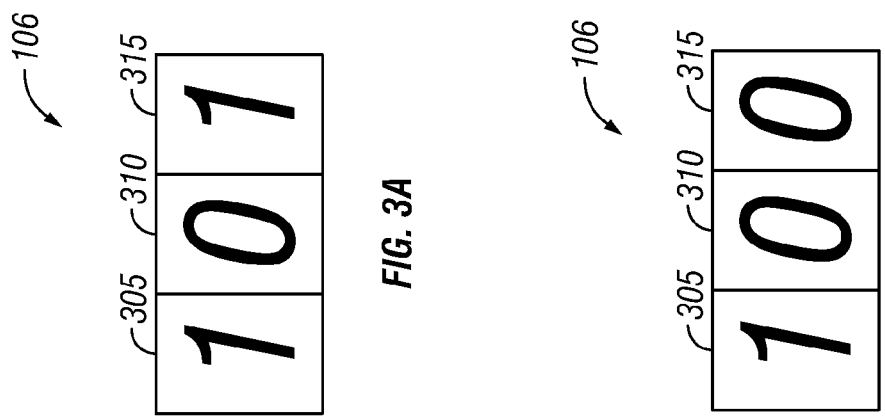
FIG. 3A
FIG. 3B
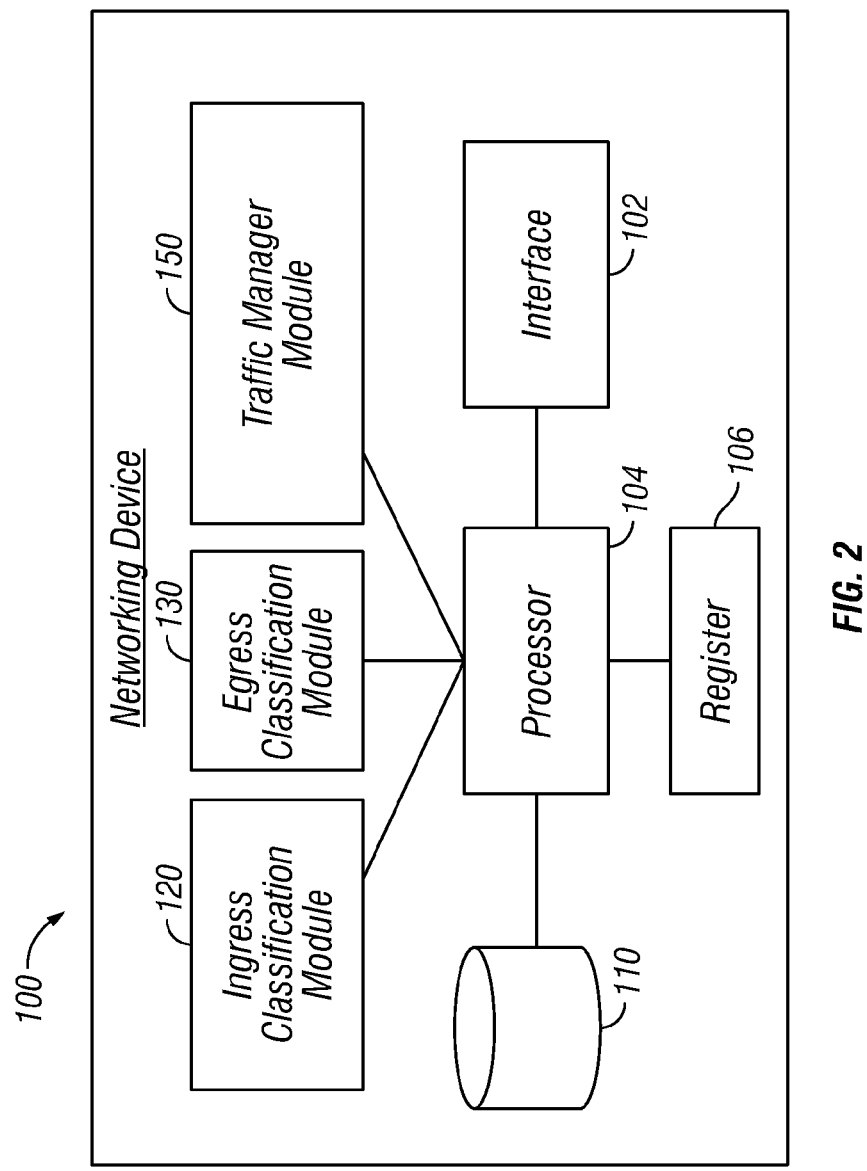
FIG. 2

SYSTEMS AND METHODS OF TEST PACKET HANDLING

TECHNICAL FIELD

The present invention relates generally to the field of computer networking and more particularly to systems and methods of test packet handling.

BACKGROUND

Conventional IT systems utilize operations, administration, and management ("OAM") to manage, perform diagnostics, and otherwise administer computer networks. One example of OAM services involves the use of test packets, such as those associated with maintenance entity groups ("MEGs"), and more particularly with MEG end points ("MEPs"). For example, some OAM services utilize Up MEPs, which involve injecting test packets near the ingress point of a system. Injecting the packets near the ingress point of the system facilitates the testing of how certain flows are being processed within the system.

Some IT systems additional utilize link aggregation (LAG) to provide increased bandwidth or backup protection.

SUMMARY

According to the present invention, certain disadvantages and problems associated with previous systems techniques for injecting test packets may be reduced or eliminated.

According to one embodiment, a method of handling test packets in an apparatus with a first unit communicatively coupled with a second unit is disclosed. The method may comprise designating a test packet with type information, the type information indicating whether the test packet is handled by the first unit, the second unit, or either unit. The method additionally includes setting one or more bits of a register of the first unit to select whether the first unit will handle all of the test packets with type information designating either unit.

Alternative embodiments may include a system comprising a first unit and a second unit. The first unit may include a first networking module comprising one or more ports configured to receive data from and transmit data to a client and a network; a first traffic manager module configured to route data among components within the system; and a first test packet handler configured to generate test packets and further configured to receive a first test packet and pass along the first test packet a first time it is received and terminally receive the first test packet after it is received a second time. The system may also include a second unit comprising a second networking module comprising one or more ports configured to receive data from and transmit data to a client and a network; a second traffic manager module configured to route data among components within the system; and a second test packet handler configured to generate test packets and further configured to receive a second test packet and pass along the second test packet a first time it is received and terminally receive the second test packet after it is received a second time. The system may further include a backplane connecting the first unit and the second unit such that the first test packet is sent along the backplane to the second unit and such that the second test packet is sent along the backplane to the first unit. The system may additionally comprise a register containing bits, the bits configured to select one or more units to handle all test packets with type information indicating the test packets are not required to be handled by the first or the second unit. In such an embodiment, the register may be configured to change the selection of handling the test packets by changing the bits.

Particular embodiments of the present invention may provide one or more technical advantages. These systems and methods may facilitate injection of test packets close to the ingress point of the networking device, which may allow the test packet to provide more accurate information about the networking device and its traffic flows. Identifying and processing test packets as described above may also allow for traffic diagnostics to be performed with existing off-the-shelf networking devices, reducing the need for designing, building, and/or purchasing additional hardware. For example, in some embodiments, the test packets may be generated by existing hardware components of the networking device, reducing the need for designing, building, and/or purchasing additional hardware.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 2 illustrates an example networking device.
FIG. 3A illustrates an example register.
FIG. 3B illustrates an example register.

DESCRIPTION OF EXAMPLE EMBODIMENTS

Figure 1:
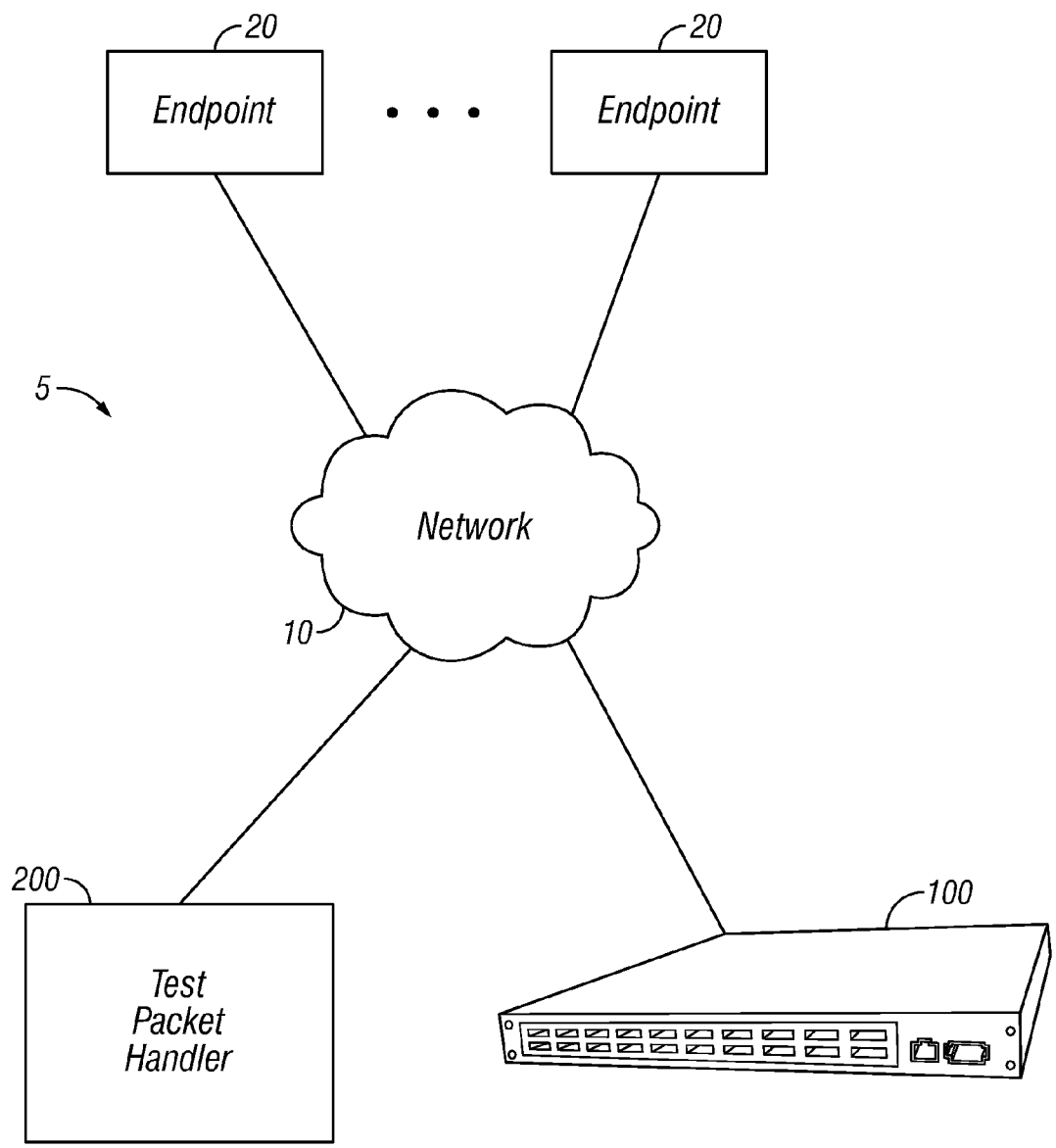
FIG. 1 illustrates an example network environment.

FIG. 1 illustrates an example network environment 5 in which test packets may be generated and sent through a portion of network environment 5. Network environment 5 includes endpoints 20, network 10, test packet handler 200, and networking device 100.

Data packets, or data flows, may be sent through network 10 from one endpoint 20, or a network node of network 10, to another endpoint 20, or another network node of network 10, and these packets may pass through networking device 100. In order to run diagnostics or obtain information about various data flows within networking device 100, test packets may be generated by test packet handler 200 and sent through networking device 100, or received by test packet handler 200 after passing through networking device 100. For example, test packet handler may send test packets through networking device 100 to provide diagnostic, management, or other types of information about networking device 100, or other downstream components of network environment 5, and about various types of traffic moving through them. Such information may include delay, delay variation, packet loss, and other packet or flow information. A second header is added to the test packet, allowing networking device 100 to identify the packet as a test packet and process it accordingly. As part of that processing, the test packets may be given header information that matches at least a portion of the header information of packets in a particular data flow so that traffic manager module 150 (illustrated in FIG. 2) can apply the same processing rules to the test packet that it applies to the data flow. Generating test packets in this manner allows for the injection of test packets close to the ingress point of networking device 100, which may provide more accurate information about networking device 100 and its traffic flows. Identifying and processing test packets in this manner may also allow for traffic diagnostics to be performed with existing off-the-shelf networking devices, reducing the need for designing, building, and/or purchasing additional hardware. For example, in some embodiments, the test packets may be generated by existing hardware components of networking device 100, reducing the need for designing, building, and/or purchasing additional hardware.

As used herein, the terms "flows," "data flows," and "test flows" each refer to a sequence of packets communicated from a sending device or sending application to a receiving device or receiving application. These terms may be used to refer to the sequence collectively or to one or more individual packets within the sequence. For example, when the term "a test packet and associated data flow" is used, this may be the flow of just the test packet, or the test packet and other associated packets. Additionally, when the term parallel is used with respect to data flows, it will be appreciated that this may include being merged with, coextensive with, the same flow, in the same general direction as, or traversing similar components as the data flow. For example, if a test packet and associated data flow and a data flow without a test packet are described, it will be appreciated that this may refer to a single flow that includes a test packet and data packets. However, in describing the present disclosure they may be referred to as two parallel flows for conceptual convenience.

According to the illustrated embodiment, network environment 5 includes endpoints 20 that communicate with other endpoints 20 through network 10 and networking device 100. Endpoints 20 may be laptops, personal computers, handheld devices, smartphones, servers, or other suitable components for sending and/or receiving data packets. Endpoints 20 send data packets, or flows, through network 10 and networking device 100. These flows may have headers or other associated information indicating how the data traffic should be handled by network device 100 and/or other portions of network 10. In order to evaluate how these flows are being processed by networking device 100, test packets generated by test packet handler 200 can merge with these data flows and experience the same or similar processing by networking device 100. Additionally, test packets and/or associated data flows may be received by test packet handler 200 after experiencing the same or similar processing by networking device 100.

Network 10 represents any suitable network operable to facilitate communication between the components of network environment 5. Network 10 may include any interconnecting system capable of transmitting audio, video, signals, data, messages, or any combination of the preceding. Network 10 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components. As used herein, network 10 may refer to all or portions of network environment 5. For example, network 10 may be referred to as separate from networking device 100 when describing communication of packets between endpoints 20 and networking device 100, or network 10 may be described as including networking device 100 when discussing communication of data packets between endpoints 20.

Test packet handler 200 represents any suitable components that generate test packets for processing by networking device 100 or receive test packets. Test packet handler 200 may be a field-programmable gate array ("FPGA"), computer chip, server, workstation, virtual machine, software, or any other suitable device for generating or receiving test packets. Test packet handler 200 may be a separate device communicatively connected to networking device 100 via network 10, a separate device directly connected to networking device 100, or an integral component of networking device 100. In some embodiments, test packet handler 200 is implemented with existing components of networking device 100. For example, as discussed in more detail below in reference to the example embodiment of FIGS. 4, and 7 through 12B, test packet handler 200 may be a component of traffic manager module 150. In such embodiments, utilizing existing hardware components of networking device 100 to generate or receive test packets reduces the need to design, build, or purchase additional hardware components to implement network diagnostics and management. The generated and received test packets may be any variety of test packet utilized in any application. For example, test packets may be utilized in Up MEP applications, Down MEP applications, such as service aware OAM (SOAM) packets, or other applications. Test packets may be flow related, for example SOAM packets, or they may be link related, for example, link OAM (LOAM). For some types of test packets there may be transmit test packets and receive test packets which may be related to each other. Test packet handler 200 may be separated into distinct components. For example, in some embodiments, test packet handler 200 may include a test packet generator and a test packet receiver. In some embodiments these may be physically distinct components, or they may be conceptually, logically, or electronically distinct components. As used herein, the term handle or handling may include generating, receiving, originating, terminating, processing, or routing. For example, test packet handler 200 may be configured to originate a test packet. Alternatively, test packet handler 200 may be configured to terminally receive a test packet and process the information contained therein. For example, a test packet may be received at test packet handler 200 and experience processing at test packet handler 200 and routing within networking device 100 prior to being terminally received at test packet handler 200.

Networking device 100 represents any suitable components that receive packets from one or more components of network 10 and apply one or more processing rules. Networking device 100 may include a switch, router, network server, remote server, workstation, web server, virtual machine, virtual switch, virtual router, or any other suitable networking device operable to communicate with one or more devices over network 10 and process packets. As illustrated in FIG. 1, networking device 100 may include multiple physical ports capable of connecting networking device 100 to network 10, though other embodiments may have a single physical port. The functions of networking device 100 may be performed by any suitable combination of one or more switches or other components at one or more locations, and networking device 100 may include any suitable component that performs networking functions, such as switching or routing.

Networking device 100 is operative to process data packets received from endpoints 20 through network 10 as well as test packets generated or received by test packet handler 200. These test packets are identified as test packets by networking device 100 and processed such that they undergo the same traffic policing, shaping, and other traffic management procedures within traffic manager module 150 (illustrated in FIG. 2) as corresponding data packets of the related flow. Injecting test packets near the ingress point of networking device 100 and processing the test packets in this manner, or separating test packets near the egress point of networking device 100 provides a mechanism for determining how different types of data traffic are being managed by networking device 100 or another component of network environment 5. This mechanism can be utilized to provide diagnostic, management, or other types of information about networking device 100, or other components of network environment 5, and about various types of traffic moving through those components. Such information may include delay, delay variation, packet loss, and other packet or flow information.

FIG. 2 illustrates an example networking device 100, which includes network interface 102, processor 104, register 106, memory 110, ingress classification module 120, egress classification module 130, and traffic manager module 150.

Network interface 102 represents any suitable device or component operable to receive information from network 10, transmit information through network 10, perform suitable processing of the information, communicate to other devices, or any combination thereof. For example, network interface 102 may be any port or connection, real or virtual, including any suitable hardware and/or software, including protocol conversion and data processing capabilities, to communicate through a LAN, WAN, or other communication system that allows networking device 100 to exchange information with network 10, endpoints 20, other networking devices 100, or other components of network environment 5. Network interface 102 is operable to receive data packets from endpoints 20, process the packets according to processing rules, and communicate the packets to endpoint 20 or another component of network environment 5. Network interface 102 may also be utilized to receive test packets. In some embodiments, network interface 102 is operative to receive test packets from test packet handler 200. In other embodiments, network interface 102 may receive test packets from a different source such that the test packet is configured to terminate at network device 100. Network interface 102 may be a loopback interface of networking device 100. Using a loopback interface may provide an efficient means of injecting test packets near the ingress point of networking device 100 in embodiments where test packet handler 200 is an internal component of networking device 100. In other embodiments, using a loopback interface may provide efficient means of allowing a test packet to experience the same or similar processing as the data flow it is accompanying prior to being terminated at test packet handler 210. Furthermore, the use of an existing loopback interface may facilitate the injection of test packets into existing off-the-shelf devices without requiring additional and potentially expensive hardware or requiring the development of expensive, specialized networking devices. In some embodiments, network interface 102 is a dedicated network interface for test packets. Utilizing a dedicated network interface for test packets may provide an efficient means of identifying and labeling test packets without requiring packet inspection or additional analysis. In some embodiments, network interface 102 is a dedicated loopback interface. In some embodiments, one or more interfaces of network device 100 may be dedicated to loopback of test packets, while the remaining interfaces carry customer packets.

Processor 104 communicatively couples to network interface 102 and memory 110 and controls the operation and administration of ingress classification module 120, egress classification module 130, and traffic manager module 150 by processing information received from network interface 102 and memory 110. Processor 104 includes any hardware and/or software that operates to control and process information. Processor 104 may be a programmable logic device, a microcontroller, a microprocessor, FPGA, any suitable processing device, or any suitable combination of the preceding. Processor 104 may also be configured to interact with a register 106. For example, the processor may read, change, initialize, or clear values in register 106.

Register 106 may be any computer-readable medium that stores, either permanently or temporarily, data. Register 106 may include any one or a combination of volatile or non-volatile local or remote devices suitable for storing information. For example, register 106 may include random access memory (RAM), read only memory (ROM), flash memory, magnetic storage devices, optical storage devices, network storage devices, cloud storage devices, or any other suitable information storage device or a combination of these devices. This data may be in the form of bits, or groups of bits. For example, register 106 may contain bits indicating how certain data flows, packets, or components are to be handled. Register 106 may contain bits indicating activation or de-activation of certain components. For example, register 106 may have a bit indicating that test packet handler 200 will not handle a certain type of test packet and/or associated data flows and another bit indicating it will handle other types of test packets and/or associated data flows. Register 106 may be separate from other components of networking device 100, or it may be integrated with one or more components of networking device 100.

Register 106 may be configured such that processor 104 may read the data from register 106, and may also change the data in register 106. For example, processor 104 may initialize register 106 when networking device 100 receives power, and may read the data in register 106 to determine how to handle certain types of test packets. Processor 104 may additionally modify the data in register 106 to change how test packet handler 200 handles test packets. For example, register 106 may have a bit set to "1" to indicate that test packet handler 200 should handle test packets of a certain type. Processor 104 may change that same bit to "0" to indicate that test packet handler 200 should not handle test packets of the certain type. In this way, handling of all test packets of a certain type may be modified by processor 104 changing a single bit in register 106. It will be appreciated by those of skill in the art that while a single bit is described here, any of a variety of configurations of bits and/or data may be used.

FIG. 3A illustrates an example of register 106 in accordance with some embodiments of the present invention. Register 106 is shown as containing three bits. As shown in FIG. 3A, bit 305 is a "1" indicating that test packet handler 200 associated with register 106 should handle a first type of test packets. FIG. 3A also shows bit 310 is a "0" indicating that test packet handler 200 associated with register 106 should not handle a second type of test packets. FIG. 3A additionally shows bit 315 is a "1" indicating that test packet handler 200 associated with register 106 should handle a third type of test packets. If it is desired to have test packet handler 200 no longer handle the third type of test packets, as shown in FIG. 3B, bit 315 may be changed to a "0," indicating that test packet handler 200 should no longer handle the third type of test packets. It will be appreciated that the present disclosure also contemplates the transition from FIG. 3B to FIG. 3A. In other words, bit 315 may be initially a "0," indicating that test packet handler 200 should not handle a third type of test packet. Bit 315 may then be changed to a "1" indicating that test packet handler 200 should handle the third type of test packet.

Memory 110 stores, either permanently or temporarily, data, operational software, or other information for processor 104, other components of networking device 100, or other components of network environment 5. Memory 110 includes any one or a combination of volatile or nonvolatile local or remote devices suitable for storing information. For example, memory 110 may include random access memory (RAM), read only memory (ROM), flash memory, magnetic storage devices, optical storage devices, network storage devices, cloud storage devices, or any other suitable information storage device or a combination of these devices. Memory 110 may include any suitable information for use in the operation of networking device 100. For example, memory 110 may include logic or processing rules that are operative to control the processing of packets by networking device 100. Memory 110 may be separate from other components of networking device 100, or it may be integrated with one or more components of networking device 100. As an example, in some embodiments, memory 110, or a portion of memory 110, may be integrated with an FPGA implementing traffic manager module 150. Additionally, in some embodiments, memory 110 may include register 106.

Ingress classification module 120 represents any suitable hardware; any suitable set of instructions, logic, or code embodied in a computer-readable storage medium; or any combination thereof that is operable to control the processing of packets by networking device 100 upon ingress to networking device 100. Ingress classification module 120 is operative to process packets received by network interface 102 and modify, classify, or otherwise process the packets before or after the packets are processed by traffic manager module 150. Such processing may include adding or removing headers, translating, copying header information, assigning packet priority information, assigning an ingress or egress profile that defines how the packet is to be processed, assigning a destination interface indicating the interface to which the packet is to be sent after processing, hashing, and utilizing trunk tables. The operation of ingress classification module 120 may be determined by local or remote hardware configuration, local or remote software configuration, or any combination thereof.

In some embodiments, ingress classification module 120 processes a test packet received by network interface 102, which may be a loopback interface. The test packet includes a first header, such as a VLAN header, that identifies a flow. This header may be the same as a header of other data packets whose processing the test packet is intended to mirror. For example, the test packet may contain internal ingress VLAN information matching the internal ingress VLAN information for the data flow the test packet is intended to analyze. Network interface 102 or ingress classification module 120 may add a second header to the test packet that identifies the packet as a test packet. The addition of the second header may allow test packets with VLAN information matching existing data flows from colliding with the corresponding data packets, or creating other processing errors, within network module 120. The addition of the second header may also facilitate efficient identification and processing of the test packets by subsequent components of networking device 100.

Ingress classification module 120 then assigns processing rules to the packet based on information contained in the first header, the second header, or both, so that the same processing rules will be applied to the test flow and its corresponding data flow by traffic manager module 150. These processing rules include packet priority information, an ingress profile, an egress profile, a destination interface, and/or other rules indicating how the packet is to be processed. Ingress classification module 120 may also assign information indicating a class of service ("CoS"), such as, for example, the CoS field described in Institute of Electrical and Electronics Engineers ("IEEE") standard 802.1Q. Ingress classification module 120 also assigns to the test packet a class tag that allows traffic manager module 150 to identify the packet as a test packet. Ingress classification module 120 may then write or copy the information in the first header into the second header, so that the first and second headers include the same information. This copying may include writing the entire contents or a substantial portion of the contents of the first header into the second header. At any suitable point in the flow, either the first or second header can then be removed (since they now contain the same information), at which point the test packet more closely resembles a data packet in the corresponding flow. The test packet is then passed to traffic manager module 150. After processing by traffic manager module 150, the packet may be routed to egress classification module 130 for egress processing.

Egress classification module 130 may perform egress processing of data flows and/or test packets. Such egress processing may include assigning egress packet priority, such as Ethernet "p" bits, based on the packet's CoS and/or egress profile and sending the packet to the indicated destination interface. The operation of ingress classification module 120 allows networking device 100 to efficiently identify test packets and prepare them for processing by traffic manager module 150. Furthermore, ingress classification modules 120 and/or egress classification module 130, in conjunction with the use of a network interface 102 dedicated to the injection of test packets, may reduce the need for additional or specialized hardware, providing a simplified and cost-effective means of performing traffic diagnostics and/or management.

Traffic manager module 150 represents any suitable hardware; any suitable set of instructions, logic, or code embodied in a computer-readable storage medium; or any combination thereof that is operable to perform traffic policing, traffic shaping, and/or other traffic processing. For example, in some embodiments, traffic manager module 150 is an FPGA or other hardware component configured to enforce processing rules when processing packets.

In operation, traffic manager module 150 receives packets—which may be data packets, test packets, or other types of packets—that have been processed by ingress classification module 120. Traffic manager module 150 examines a class tag of the packet to identify the packet's type. If traffic manager module 150 identifies a class tag identifying the packet as a test packet, it removes either the first or second header, which now contain duplicate information, as described above. In other embodiments, ingress classification module 120 may remove the first or second header before passing the packet to traffic manager module 150. Upon the removal of the duplicate header, the test packet appears to be part of the same data flow as data packets having the same or similar header information. Based on processing rules and/or other information associated with the test packet, traffic manager module 150 performs traffic policing, shaping, and or other processing on the test packet. Traffic manager module 150 may also perform header translation, such as translating VLAN information in the first header to egress VLAN information, and assign an egress profile in order to facilitate egress processing by egress classification module 130. Upon performing the traffic policing, shaping, and other processing indicated by the processing rules and other information associated with the packet, traffic manager module 150 passes the packet to egress classification module 130 for egress processing.

Processing of the test packet by traffic manager module 150, and subsequent egress processing by egress classification module 130, may occur similarly or identically to the processing of data packets having the same or similar header information. This allows the test packets to experience the same packet processing within networking device 100, or other downstream components of network environment 5, as the associated data packets, facilitating traffic diagnostics and management, such as OAM operations. Furthermore, in some embodiments, traffic manager module 150 may be configured to operate as test packet handler 200 as well, generating or receiving the test packets and sending them to a dedicated loopback port of networking device 100 or other loopback mechanism. This may provide a simplified mechanism for performing traffic diagnostics and management without requiring additional hardware or the development of expensive, specialized networking devices 100 or components thereof.

Additionally, the above-described processing may happen, essentially, in reverse. This may allow for both generation of test packets and reception of test packets, for example, in the context of Up MEP. For example, when a test packet is terminating at network element 100 rather than originating at network element 100, the test packet may have identifying information such as a header that is similar to or the same as the data flow it is accompanying when it arrives at network element 100, such that it experiences the same or similar handling. A received data flow that includes a test packet may be received by ingress classification module 120. The data flow may then be routed to traffic manager module 150. Traffic manager module 150 may include test packet handler 200. Traffic manager module 150 and/or test packet handler 200 may then recognize the test packet in the data flow and mark it for loopback via ingress classification module 120. This may include adding to, modifying, duplicating, or erasing some or all of the header data; adding, modifying, or erasing other meta-tag information, or other means as described herein. The data flow including the test packet may then be routed to networking module 120 and/or network interface 102. The test packet may then be looped back to test packet handler 200 for handling while the data flow, now without the test packet, may continue on its trajectory.

Figure 4A:
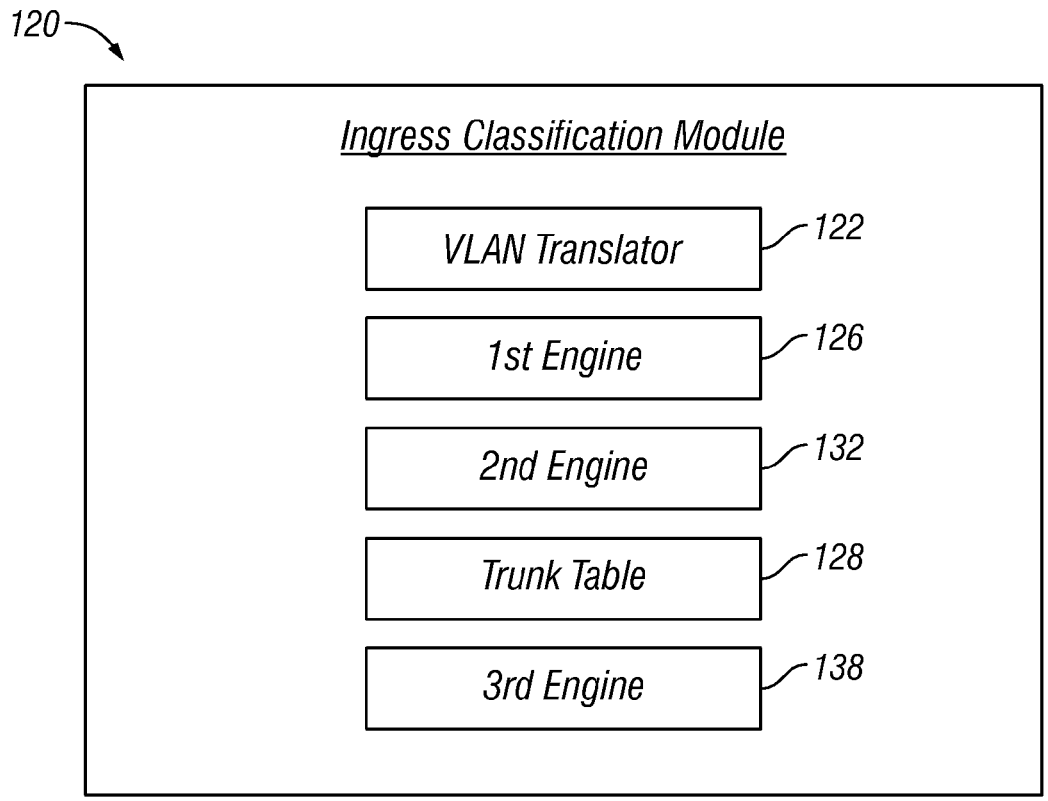
FIG. 4A illustrates an example ingress classification module.

FIG. 4A illustrates an example ingress classification module 120, which includes VLAN translator 122, first engine 126, second engine 132, trunk table 128, and third engine 138. Ingress classification module 120 is operative to process packets received by network interface 102 and modify, classify, or otherwise process the packets before the packets are processed by traffic manager module 150. For example, ingress classification module 120, or one or more of its components, may be operative to process ingressing packets before they are processed by traffic manager module 150. Such processing includes adding, removing, and/or translating headers, copying header information, assigning packet priority information, assigning an ingress or egress profile that defines how the packet is to be processed, assigning a destination interface indicating the interface to which the packet is to be sent after processing. The operation of ingress classification module 120 may be determined by local or remote hardware configuration, local or remote software configuration, or any combination thereof. In the illustrated embodiment, various functions of ingress classification module 120 are implemented by VLAN translator 122, first engine 126, second engine 132, trunk table 128, and third engine 138. In some embodiments, one or more of these components may be implemented by configuring existing software and/or hardware components of an off the shelf networking device, which may provide a cost-effective mechanism for network management and diagnostics.

VLAN translator 122 represents any suitable hardware; any suitable set of instructions, logic, or code embodied in a computer-readable storage medium; or any combination thereof that is operable to translate VLAN header information included in a packet. These packets may be data packets, test packets, or any other type of packet. VLAN translator 122 may be operative to process ingressing packets before they are processed by traffic manager module 150, egressing packets after they are processed by traffic manager module 150, or both ingressing and egressing packets. The translation of external VLANs to internal VLANs, and vice versa, facilitates particularized processing of various flows within networking device 100 without interfering with the downstream processing of the packets once they have exited networking device 100.

When processing ingressing packets, VLAN translator 122 translates an external VLAN header into an internal VLAN header, which may be unique. Alternatively, internal VLAN information may be stacked over the external VLAN information in the ingressing packets. The packets that make up an ingress flow include header information, such as VLAN header information. This VLAN header information may be associated with internal VLAN information, such as an internal ingress VLAN that is used to determine processing in one or more components of ingress classification module 120, egress classification module 130, or traffic manager module 150. VLAN translator 122 identifies external VLAN information in the header and translates this into internal VLAN information. For example, VLAN translator 122 may perform an internal ingress VLAN look up in a database in memory 110 to find an internal ingress VLAN associated with the external VLAN information. After VLAN translation, the ingressing flow may be processed by first engine 126. The internal VLAN may be unique within system 5 (or within components of system 5). Unique internal VLAN information may enable the look-up of flow information using only the internal VLAN, without requiring additional information such as the corresponding ingress port. In certain embodiments, a unique internal VLAN may be necessary to operate with one or more vendor devices used in system 5.

First engine 126 represents any suitable hardware; any suitable set of instructions, logic, or code embodied in a computer-readable storage medium; or any combination thereof that is operable to inspect packet headers of ingressing packets and process the packets. These packets may be data packets, test packets, or any other type of packet. When processing ingressing packets, first engine 126 is operative to assign processing rules to the packets based on the internal ingress VLAN information and/or other header information. The processing rules may include a destination interface of networking device 100 and an ingress profile. These assignments may entail adding header information to the packet, replacing header information or portions of header information, storing information in networking device 100, other suitable methods, or any combination thereof. The destination interface indicates the port or other interface of networking device 100 to which the packet is to be directed as it exits networking device 100. The ingress profile includes information that determines how the packet is to be processed by networking device 100.

First engine 126 is also operable to process test packets. When first engine 126 processes a test packet, which has a first VLAN header containing the same VLAN information as a particular data flow with which it is associated and a second VLAN header identifying the packet as a test packet, first engine 126 assigns the destination interface and ingress profile associated with the first VLAN header. In other words, first engine 126 assigns to the test packet the same destination interface and ingress profile that it would assign to the data flow with which the test packet is associated. This allows the test packet to receive the same processing as the data flow by traffic manager module 150.

Second engine 132 represents any suitable hardware; any suitable set of instructions, logic, or code embodied in a computer-readable storage medium; or any combination thereof that is operable to assign processing rules to packets. These packets may be data packets, test packets, or any other type of packet. Second engine 132 may be operative to process ingressing packets before they are processed by traffic manager module 150, egressing packets after they are processed by traffic manager module 150, or both ingressing and egressing packets. When processing ingressing packets, second engine 132 is operative to assign processing rules, such as internal packet priority, CoS, and a class tag. This processing may entail adding header information to the packet, replacing header information or portions of header information, storing information in networking device 100, other suitable methods, or any combination thereof. Internal packet priority indicates how the packet should be treated by networking device 100. For example, packet priority information may be one of four priority indicators (such as A, B, C, or D) that may influence scheduling or processing of the packet. CoS indicates a class of service, such as, for example, the CoS field described in IEEE standard 802.1Q. The class tag indicates a flow type and can be used by traffic manager module 150 to determine how the packet is to be processed. For example, the class tag may indicate that the packet is a test packet, a certain type of test packet, a data packet, a certain type of data packet, or another type of packet altogether.

Second engine 132 is also operable to process test packets. When second engine 132 processes a test packet, which has a first VLAN header containing the same VLAN information as a particular data flow with which it is associated and a second VLAN header identifying the packet as a test packet, as described above, second engine 132 assigns the CoS and/or internal packet priority based on the ingress profile and, optionally, external packet priority associated with the packet. In other words, first engine 126 assigns to the test packet the same processing rules that it would assign to the data flow with which the test packet is associated. This allows the test packet to undergo the same traffic policing, shaping, and other traffic management procedures within traffic manager module 150 as the data flow (or other type of flow) with which the test packet is associated while also providing an efficient mechanism for traffic manager module 150 to identify test packets and execute additional processing steps as needed.

Trunk table 128 represents any suitable hardware; any suitable set of instructions, logic, or code embodied in a computer-readable storage medium; or any combination thereof that is operable to identify information regarding link aggregation (LAG). Trunk table 128 may be operative to indicate which interface and/or ports are to be used in communication. For example, for situations of 1:1 LAG across two ports, trunk table 128 may indicate which of the ports is active and which is a backup port. In another example, for situations of 0:N LAG across N ports, trunk table 128 may indicate which of the N ports will be used for communication. Alternatively, for 0:N LAG, hashing per Ethernet frame or packet may indicate which of the N ports is selected.

Third engine 138 represents any suitable hardware; any suitable set of instructions, logic, or code embodied in a computer-readable storage medium; or any combination thereof that is operable to modify packet header information. Third engine 138 is operative to process ingressing test packets before they are processed by traffic manager module 150. This processing includes copying the VLAN information in the test packet's first VLAN header (which includes internal ingress VLAN information, as described above) into the test packet's second VLAN header, resulting in two headers containing the same VLAN information. Copying the internal ingress VLAN information into the second VLAN header may simplify the processing required of traffic manager module 150, which can drop either the first or second VLAN header once it identifies the packet as a test packet since both headers contain the same information at this point.

Figure 4B:
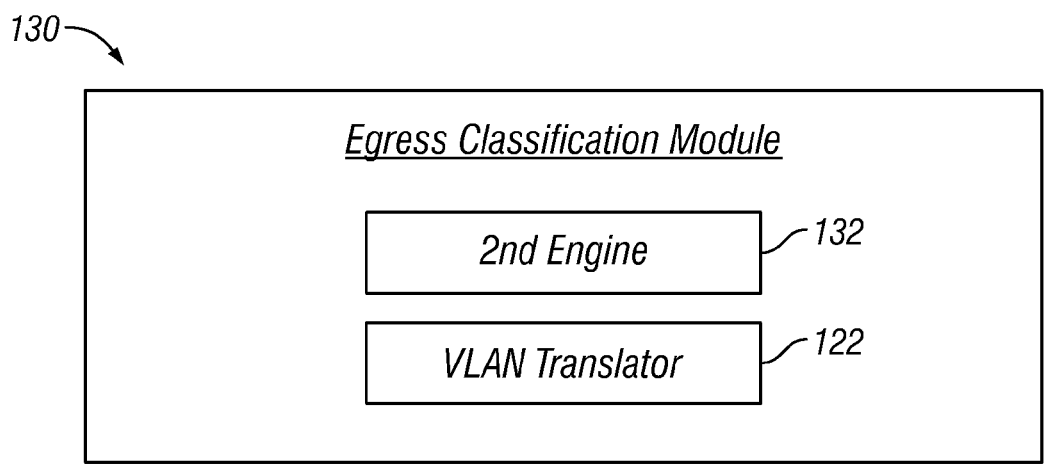
FIG. 4B illustrates an example egress classification module.

FIG. 4B illustrates an example egress classification module 130, which includes 2nd engine 132 and VLAN translator 122. Egress classification module 130 is operative to process packets after the packets are processed by traffic manager module 150. For example, egress classification module 130, or one or more of its components, may be operative to process egressing packets after they are processed by traffic manager module 150. Such processing includes adding, removing, and/or translating headers, copying header information, assigning packet priority information, assigning an egress profile that defines how the packet is to be processed, assigning a destination interface indicating the interface to which the packet is to be sent after processing. Such egress processing may include assigning egress packet priority, such as Ethernet "p" bits, based on the packet's CoS and/or egress profile and sending the packet to the assigned destination interface. Egress processing may also include translating and/or stripping internal egress VLAN information. The operation of egress classification module 130 may be determined by local or remote hardware configuration, local or remote software configuration, or any combination thereof. In the illustrated embodiment, various functions of egress classification module 130 are implemented by VLAN translator 122 and second engine 132. In some embodiments, one or more of these components may be implemented by configuring existing software and/or hardware components of an off the shelf networking device, which may provide a cost-effective mechanism for network management and diagnostics.

When processing egressing packets, VLAN translator 122 translates an internal VLAN header into an external VLAN header to prepare the packets for exiting networking device 100. While in some embodiments, VLAN translator 122 operates as part of traffic manger module 150, in other embodiments, VLAN translator 122 may operate as part of another component and may be situated just prior to egress. Traffic manager 150 may translate internal ingress VLAN information into internal egress VLAN information. In such cases, VLAN translator 122 is operative to translate the internal egress VLAN information into external VLAN information. For example, VLAN translator 122 may replace or overwrite the internal egress VLAN information contained in a VLAN header of an egressing packet with external VLAN information. Updating the packets with external VLAN information prepares them for exiting networking device 100. In certain embodiments, VLAN translator 122 removes one or more headers or tags that were previously added to the packets.

Second engine 132 represents any suitable hardware; any suitable set of instructions, logic, or code embodied in a computer-readable storage medium; or any combination thereof that is operable to assign processing rules to packets. These packets may be data packets, test packets, or any other type of packet. Second engine 132 may be operative to process egressing packets after they are processed by traffic manager module 150. This processing may entail adding header information to the packet, replacing header information or portions of header information, storing information in networking device 100, reading, modifying, or erasing meta-data, other suitable methods, or any combination thereof. While ingress classification module 120 and egress classification module 130 are shown as separate components, it will be appreciated that this may merely be a logical designation and they may be performed by the same physical components. However, they need not be, and may be distinct physical components.

Figure 5:
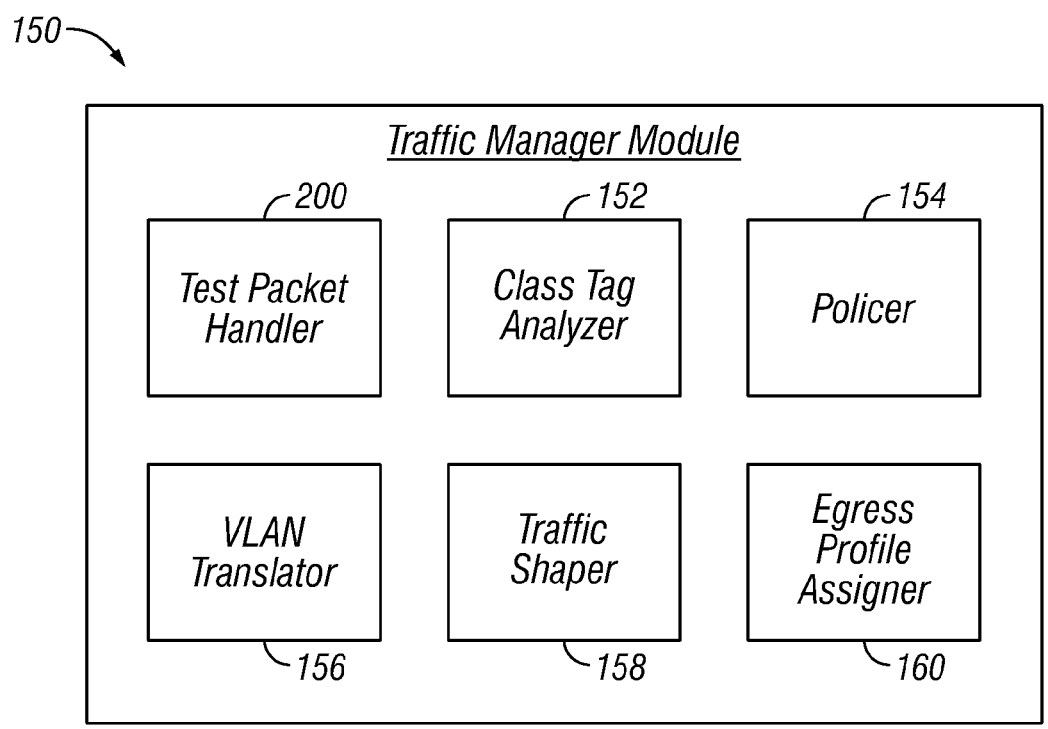
FIG. 5 illustrates an example traffic manger module.

FIG. 5 illustrates an example traffic manger module 150, which includes test packet handler 200, class tag analyzer 152, policer 154, VLAN translator 156, traffic shaper 158, and egress profile assignor 160.

Traffic manager module 150 represents any suitable hardware; any suitable set of instructions, logic, or code embodied in a computer-readable storage medium; or any combination thereof that is operable to perform traffic policing, traffic shaping, and/or other traffic processing. For example, in some embodiments, traffic manager module 150 is an FPGA or other hardware component configured to enforce processing rules when processing packets. Traffic manager module 150 receives packets—which may be data packets, test packets, or other types of packets—that have been processed by ingress classification module 120 and applies policing, shaping, and other processing rules. In some embodiments, traffic manager module 150 may be multiple components. For example, traffic manager module 150 may include an up-stream traffic manager component and a down-stream traffic manager component. In some embodiments, the down-stream and up-stream traffic manager components may be distinct physical components that operate to perform the functions of traffic manager module 150.

Test packet handler 200 represents any suitable components that generate test packets for processing by networking device 100 or receive test packets after processing by networking device 100. Test packet handler 200 may be implemented as part of an FPGA, a computer chip, a virtual machine, software, or any other suitable device or component for generating or receiving test packets. In the illustrated embodiment, test packet handler 200 is implemented as part of traffic manager module 150, though in other embodiments test packet handler 200 may be a separate component of networking device 100, or it may be an entirely separate device that communicates test packets to and from networking device 100 through network 10. Utilizing existing hardware components of networking device 100 to generate and receive test packets reduces the need to design, build, or purchase additional hardware components to implement network diagnostics and management.

Class tag analyzer 152 represents any suitable hardware; any suitable set of instructions, logic, or code embodied in a computer-readable storage medium; or any combination thereof that is operable to identify a class tag associated with a packet and process the packet based on that class tag. When traffic manager module 150 receives a packet after it has been processed by ingress classification module 120, class tag analyzer 152 determines a class tag associated with the packet. The class tag may be included as part of the packet's header or associated with the packet by other means. For example, in some embodiments, the class tag may be associated with the packet's VLAN information in a database. Once class tag analyzer 152 determines the class tag, the packet is processed accordingly. For example, when class tag analyzer 152 identifies a class tag indicating that the packet is a test packet, class tag analyzer 152, or another component of traffic manager module 150, removes either the first VLAN header or the second VLAN header (both of which contain the same VLAN information, as described above). Processing packets in this manner allows the test packets to now appear as if they are part of the same flow as the corresponding data packets. The test packet thus effectively merges with the data flow as it undergoes subsequent processing in policer 154, VLAN translator 156, traffic shaper 158, and egress profile assignor 160.

Policer 154 represents any suitable hardware; any suitable set of instructions, logic, or code embodied in a computer-readable storage medium; or any combination thereof that is operable to enforce an ingress traffic contract. Certain traffic flows may have processing rules assigned to them that indicate that certain packet priority, CoS, or other policing rules apply. Policer 154 applies these rules based at least partially on the internal ingress VLAN associated with the packet, the internal packet priority assigned to the packet, and/or the CoS associated with the packet. Since the test packets have effectively merged with the corresponding data flow at this point, test packets undergo the same policing by policer 154 as the data flow. This allows subsequent analysis of the test packets to yield information about the processing of that data flow. Following traffic policing, packets are processed by VLAN translator 156.

VLAN translator 156 represents any suitable hardware; any suitable set of instructions, logic, or code embodied in a computer-readable storage medium; or any combination thereof that is operable to translate VLAN header information included in a packet. These packets may be data packets, test packets, or any other type of packet. VLAN translator 156 is operative to translate the internal ingress VLAN information into internal egress VLAN information. VLAN translator 156 identifies internal ingress VLAN information in the VLAN header and translates this into internal egress VLAN information. For example, VLAN translator 156 may perform an internal egress VLAN look up in a database in memory 110, or in another database, to determine an internal egress VLAN associated with the internal ingress VLAN information. The translation of internal ingress VLAN information to internal egress VLAN information facilitates the setting of an egress profile by egress profile assignor 160. Following translation of the VLAN information, the packets are processed by traffic shaper 158.

Traffic shaper 158 represents any suitable hardware; any suitable set of instructions, logic, or code embodied in a computer-readable storage medium; or any combination thereof that is operable to perform traffic shaping on one or more data flows. Traffic shaping may involve smoothing egress traffic of one or more flows and other methods of modifying the flow of packets as they leave networking device 100. Traffic shaper 158 may perform traffic shaping based on information associated with the packet's destination interface, information associated with the particular flow, general rules, and/or other factors. Again, since the test packets have effectively merged with the corresponding data flow at this point, test packets undergo the same shaping by traffic shaper 158 as the data flow. This allows subsequent analysis of the test packets to yield information about the processing of that data flow. Following traffic shaping, packets are processed by egress profile assignor 160.

Egress profile assignor 160 represents any suitable hardware; any suitable set of instructions, logic, or code embodied in a computer-readable storage medium; or any combination thereof that is operable to determine VLAN information associated with a packet and set an egress profile based on that information. These packets may be data packets, test packets, or any other type of packet. As described above, VLAN translator 156 replaces the internal ingress VLAN information with internal egress VLAN information. Egress profile assignor 160 identifies the internal egress VLAN information in the VLAN header and determines an egress profile associated with the information. For example, egress profile assignor 160 may perform an egress profile look up in a database in memory 110, or in another database, to determine the egress profile associated with the VLAN information. Egress profile assignor then sets the egress profile for the packet, which may include adding header information to the packet, replacing header information or portions of header information, storing information in networking device 100, other suitable methods, or any combination thereof. After the assignment of the egress profile, the packet is sent to egress classification module 130, which includes components capable of performing egress processing, or to another module operative to perform egress processing.

As described previously, for test packets terminating at networking device 100, the processing described herein may be performed, essentially in reverse, such that a test packet accompanying a data flow may experience the same processing and handling within networking device 100 before being terminated at test packet handler 200.

Figure 6:
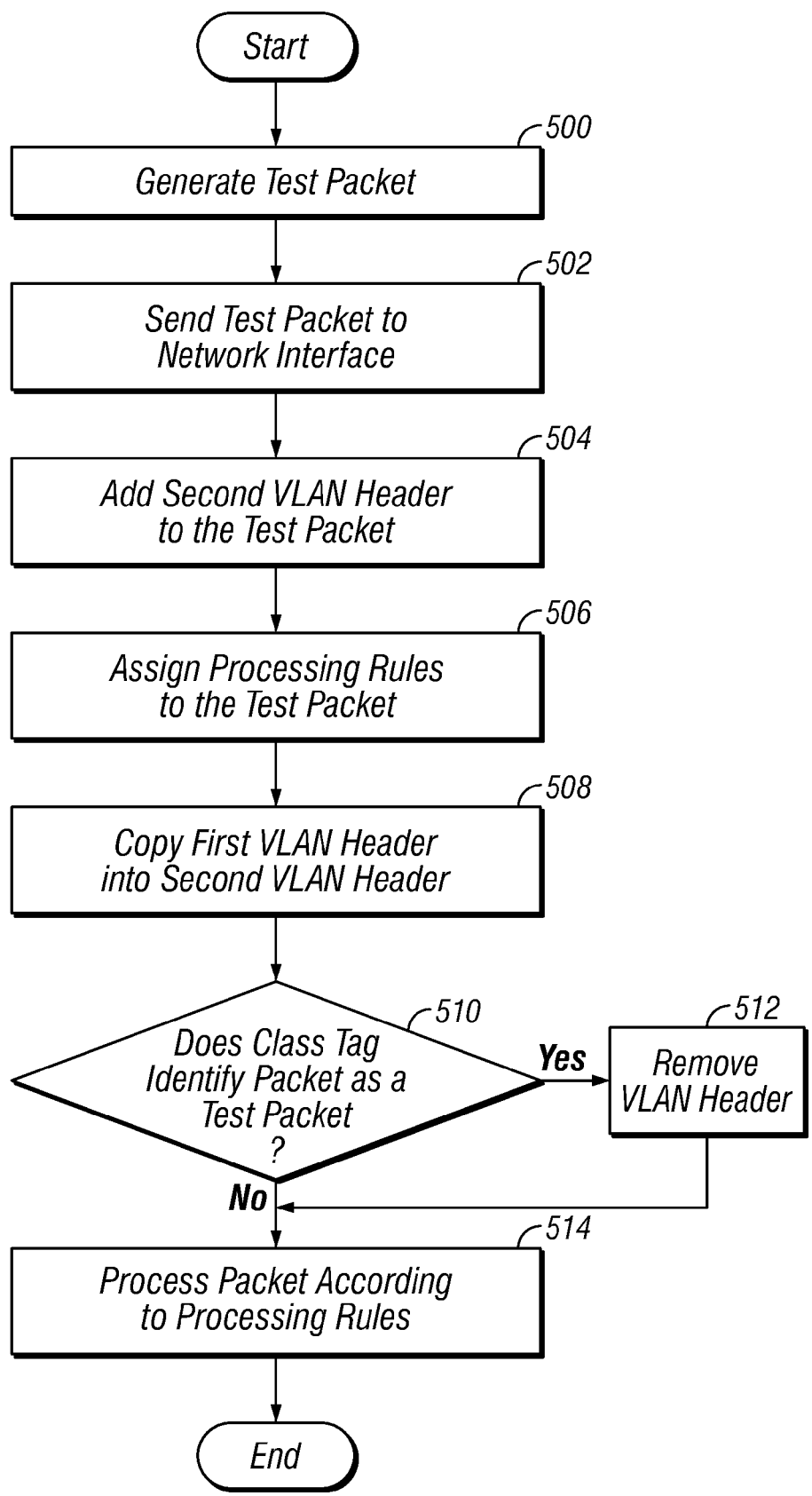
FIG. 6 is a diagram that illustrates a test packet processing sequence by an example networking device.

FIG. 6 is a diagram that illustrates a test packet processing sequence by networking device 100.

At step 500, a test packet is generated by test packet handler 200. Test packet handler 200 may be a separate device communicatively connected to networking device 100 via network 10, a separate device directly connected to networking device 100, or an integral component of networking device 100. In some embodiments, test packet handler 200 is implemented with existing components of networking device 100. For example, as discussed above in reference to FIG. 5, test packet handler 200 may be a component of traffic manager module 150. In such embodiments, utilizing existing hardware components of networking device 100 to generate test packets reduces the need to design, build, or purchase additional hardware components to implement network diagnostics and management. The generated test packets may be Up MEPs, other types of test packets, or any combination thereof. The test packet may contain internal ingress VLAN information matching the internal ingress VLAN information for the data flow the test packet is intended to analyze.

At step 502, the test packet is sent to network interface 102 of networking device 100. In embodiments in which test packet handler 200 is an internal component of networking device 100, the network interface 102 receiving the test packet may be a loopback interface. Using a loopback interface may provide an efficient means of injecting test packets near the ingress point of networking device 100 from an internal component of networking device 100, which may allow OAM services to obtain more accurate information about networking device 100 and its traffic flows. Furthermore, the use of an existing loopback interface may facilitate the injection of test packets into existing off-the-shelf devices without requiring additional and potentially expensive hardware or requiring the development of expensive, specialized networking devices. In some embodiments, network interface 102 is a dedicated network interface for test packets. For example, networking device 100 may have a plurality of interfaces, and one particular interface may be configured to receive test packets that are to be looped back and route those test packets back up through networking device 100. However, the network interface need not be dedicated to looping back test packets, and may provide other functionality for networking device 100. Utilizing a dedicated network interface for test packets may provide an efficient means of identifying and labeling test packets without requiring packet inspection or additional analysis. In some embodiments, network interface 102 is a dedicated loopback interface.

At step 504, a second VLAN header is added to the test packet. The second VLAN header contains information identifying the packets as test packets. The VLAN information contained in the second VLAN header may contain the same priority bits as the VLAN information in the first VLAN header. The addition of the second VLAN header may prevent test packets with VLAN information matching existing data flows from colliding with the corresponding data packets, or creating other processing errors, within network module 120. The addition of the second VLAN header may also facilitate efficient identification and processing of the test packets by subsequent components of networking device 100.

At step 506, the test packet is assigned processing rules. Assigning processing rules may entail adding header information to the packet, replacing header information or portions of header information, storing information in networking device 100, other suitable methods, or any combination thereof. The assignment of processing rules may be based on the internal ingress VLAN information contained in one or more of the test packet's VLAN headers, which facilitates the assignment and application of the same processing rules to the test flow and its corresponding data flow. The processing rules may include packet priority information, an ingress profile, an egress profile, a destination interface, CoS, a class tag, and/or other rules indicating how the packet is to be processed. The destination interface indicates the port or other interface of networking device 100 to which the packet is to be directed as it exits networking device 100. The ingress profile includes information that determines how the packet is to be processed during ingress by networking device 100. The egress profile includes information that determines how the packet is to be processed during egress. In some embodiments, CoS includes the CoS field described in IEEE standard 802.1Q, while in other embodiments, CoS may include other types of CoS information. The class tag allows traffic manager module 150 to identify the packet as a test packet during subsequent processing.

The assignment of processing rules in step 506 may also be based on previously assigned processing rules. For example, CoS may be assigned to the test packet based on the previously assigned ingress profile and/or packet priority. Furthermore, the assignment of processing rules may occur in any order, and may be performed by different components of networking device 100. For example, networking device 100 may include multiple engines, with one engine assigning an ingress profile and a destination port to the packet based on internal ingress VLAN information associated with the packet, while another engine assigns CoS based on the packet's ingress profile and packet priority and assigns a class tag based at least on VLAN information. In step 506, packets identified as test packets are assigned a class tag identifying them as test packets so that traffic manager module 150 can identify them and process them appropriately, as described below in reference to steps 510 and 512.

At step 508, the information in the test packet's first VLAN header is copied into the second VLAN header, so that the first and second VLAN headers include the same information. Copying the VLAN information in this manner allows either the first VLAN header or the second VLAN header to be dropped by traffic manager module 150. Furthermore, since at this step the packet has been assigned a class tag identifying it as a test packet, the information in the second VLAN header identifying the packet as a test packet may be redundant.

At step 510, traffic manager module 150 determines whether the class tag identifies the packet as a test packet. If not, the sequence proceeds to step 514. If so, traffic manager module 150 removes a VLAN header from the test packet. Since, as described above, the first and second VLAN headers now include the same information, either the first or second VLAN header may be dropped. Dropping the additional VLAN header allows the test packet to now merge with its corresponding data flow for processing by traffic manager module 150 during step 514.

At step 514, traffic manager module 150 processes the packet according to its assigned processing rules. Since the processing rules assigned to the test packet are the same as the processing rules assigned to its corresponding data flow, the test flows undergo substantially similar processing by traffic manager module 150 once the flows have effectively merged. For example, the test flows undergo the same shaping, policing, VLAN translation, and/or egress profile assignment as their associated data flows. After processing by traffic manager module 150, the packet may be sent to egress classification module 130 for egress processing. Such egress processing may include assigning egress packet priority, such as Ethernet "p" bits, based on the packet's CoS and/or egress profile and sending the packet to the assigned destination interface. Egress processing may also include translating and/or stripping internal egress VLAN information.

Various embodiments may perform some, all, or none of the steps described above. For example, certain embodiments may omit steps 508, 510, and 512 under certain conditions, or they may omit these steps entirely. Certain embodiments may also perform the above-described steps in different orders. For example, in one embodiment, step 508 may be performed before step 506, and in another embodiment, step 506 may be performed before step 512. Furthermore, certain embodiments may perform one or more additional steps at various points in the sequence. For example, some embodiments may perform egress processing after step 514. Alternatively, the above steps may be performed essentially in reverse for test packets to be received at test packet handler 200. In such embodiments, the test packet may be handled after experiencing the same or similar routing and processing as a data flow travelling parallel with the test packet.

With reference to FIGS. 7 through 12B, some embodiments include test packets which may be utilized in a system that employs link aggregation (LAG). This may provide increased bandwidth or provide potential backup channels of communication. For example, multiple ports 190 may be combined to function as a single port such that all ports 190 may carry data, thus effectively increasing the bandwidth and if one of the ports 190 or channels associated therewith fails, the bandwidth is merely reduced. In some embodiments, 1:1, 0:2, or 0:N LAG may be used. 1:1 LAG may be embodiments where two ports 190 are available, but only one is utilized for communication, or is "active," while the other is preserved as a backup. 0:N LAG may be embodiments in which "N" ports 190 are aggregated and any port 190 may be utilized for data communication. 0:2 LAG may be a subset of 0:N LAG in which two ports 190 are aggregated. In some embodiments, ports 190 on the network side may utilize 1:1 LAG and ports 190 on the client side may utilize 0:2, 0:N, or no LAG. The present disclosure additionally contemplates other embodiments of LAG.

Test packets, data flows, or combinations thereof may be given a type that may be stored as type information. Alternatively, type information may be determined by components interacting with the test packets, data flows, or combinations thereof. Type information may be based on the source of a data flow. Test packets to be handled by a particular unit may be given one type, while those that are not unit-specific may be given another type. For example, in a system employing two units, there may be three types: Type One for test packets and/or data flows associated with the first unit, Type Two for test packets and/or data flows associated with the second unit, and Type Three for test packets and/or data flows that are not unit-specific. Non-unit specific test packets may be further broken down into additional categories for convenience or efficiency in test packet handling. Type information may be a semi-permanent attribute such that, for example, even if a unit is removed, the type information is not changed.

A unit 180 as described herein may include an entire networking device 100, or may include some subset of components of networking device 100. For example, in some embodiments, networking device 100 may include multiple units 180 with some duplicative components. Unit 180 may have one or more ports 190, including ports that communicate with a client, which may be referred to as client ports or on the client side. Unit 180 may additionally have one or more ports 190 in communication with the network, which may be referred to as network ports or on the network side. In some embodiments, unit 180 is removable from a system employing units 180. For example, a system might have two networking devices 100 that are removable.

Unit 180 may be a plug-in unit that is removable such that if an error occurs, for example, hardware failure, software failure, or combinations thereof, or if other maintenance is desired, unit 180 may be removed from the system. Unit 180 may further be configured to handle all, or some subset of all, of the traffic arriving at and departing from the system.

Register 106 may be configured to designate which of a plurality of units 180 should handle data flows, test packets, or combinations thereof based on type information. A first bit may be set in register 106 to indicate that all Type One test packets are handled by a first unit 180*a*. A second bit may be set to indicate that all Type Two test packets are handled by a second unit 180*b*. A third bit may be set to indicate that all Type Three test packets, which may be handled by any unit 180, may be handled by the first unit 180*a*. In some embodiments, the first and the second bits are not used in register 106, and only the third bit is used. In situations in which it may be desired to move handling of Type Three test packets from the first unit 180*a* to the second unit 180*b*, a single bit may be changed to facilitate the transition of test packet handling from the first unit 180*a* to the second unit 180*b*. This may contrast with other systems which may require processor 104 to reroute all of the test packets. As there may be thousands of test packets and associated flows, this may impose significant processor burden or traffic delay. This may trigger undesired errors or false errors associated with the test packets. A transition for Type Three test packets from one unit 180*a* to another may be desired, for example, when the first unit 180*a* is removed, has a hardware failure, software failure, or experiences some other problem or error. Register 106 may additionally have bits indicating whether test packet handler 200 should be active on a given unit 180.

In some embodiments, each unit 180 may have a register 106. For example, the first unit 180*a* associated with Type One flows and designated to handle Type Three flows may have bits in register 106*a* enabling test packet handler 200 for Type One and Type Three flows and another bit in register 106*a* disabling test packet handler 200 for Type Two flows. It is contemplated that register 106*a* may be implemented in existing off-the-shelf networking devices, reducing the need for designing, building, and/or purchasing additional hardware.

To facilitate understanding of the principles described herein, a series of exemplary systems are illustrated. These examples are in no way limiting, but serve only as illustrations.

Figure 7:
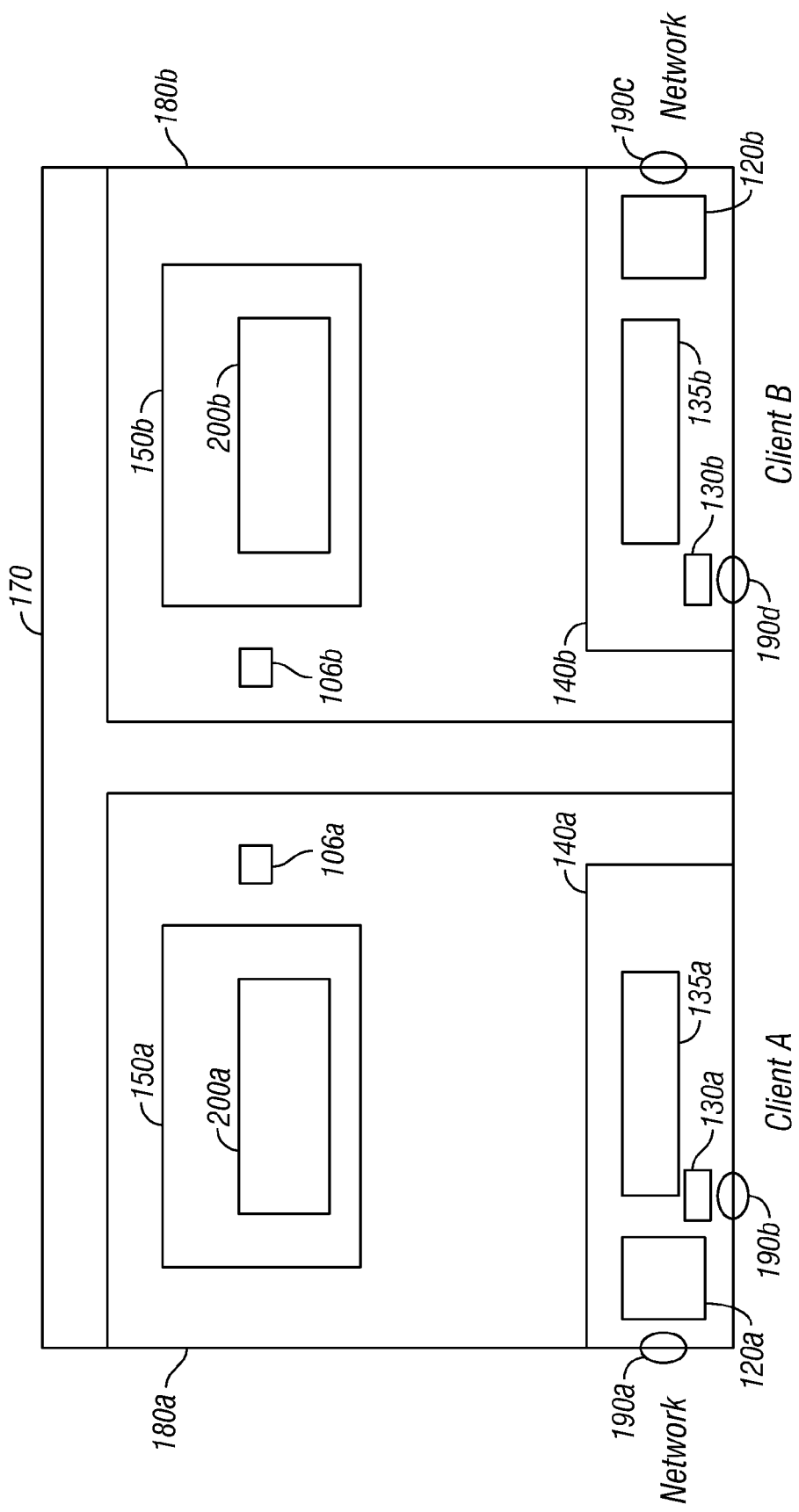
FIG. 7 illustrates an example system for handling test packets.

FIG. 7 illustrates an example of a system configured to handle test packets, which includes a first removable unit 180*a* and a second removable unit 180*b* communicatively coupled via a backplane 170. Unit 180 may be configured to operate independently, or may be configured to operate in conjunction with one or more additional units. For example, ports 190*a* and 190*c* of units 180*a* and 180*b* may be link aggregated as 1:1 LAG on the network side. Ports 190*b* and 190*d* of units 180*a* and 180*b* may employ 0:2 LAG on the client side, or have no LAG on the client side. Units 180*a* and 180*b* may each include a networking module 140*a* and 140*b*, respectively. Networking modules 140*a* and 140*b* may each include loopback modules 135*a* and 135*b*, and ingress classification modules 120*a* and 120*b*, and egress classification modules 130*a* and 130*b*. Units 180*a* and 180*b* may further include traffic manager modules 150*a* and 150*b*, respectively. Traffic manager modules 150*a* and 150*b* may include test packet handlers 200*a* and 200*b*. Units 180*a* and 180*b* may additionally include registers 106*a* and 106*b*, respectively.

Loopback module 135 may be configured to loop test packets, data flows associated therewith, or combinations thereof, back to traffic manager module 150 and/or test packet handler 200. This may be accomplished by a loop back interface as described herein. As described previously, ingress classification module 120 may be configured to route data flows to an appropriate traffic manager module 150 within the system. This may be accomplished using a trunk table, hashing, or any combination thereof. For example, trunk table 128 of ingress classification module 120 (as shown in FIG. 4A) may include information indicating which ports 190 of units 180*a* and 180*b* are active when 1:1 LAG is employed. Ingress classification module 120, egress classification module 130, and/or loopback module 135 may additionally perform some of the processing and/or provide some of the features of interface 102 described above. For example, loopback module 135 may be one or more ports 190 of networking module 120 dedicated to looping back test packets. Loopback module 135 may also use any of the engines described herein to loop the test packets back through the system.

Loopback module 135, ingress classification module 120, and egress classification module 130 may be separate components or may merely be part of networking module 140. Loopback module 135, ingress classification module 120, and egress classification module 130 may work together to perform routing and processing tasks of networking module 140. In some embodiments, loopback module 135 may modify, write, or remove meta-tag information of test packets. Loopback module 135 may also modify, write, or remove headers of test packets. In some embodiments, loopback module 135, ingress classification module 120, and egress classification module 130 are sub-components of networking module 140. For example, they may be hardware, software, or a combination thereof, that performs the tasks described. In some embodiments, loopback module 135, ingress classification module 120, and egress classification module 130 are merely conceptual subcomponents of networking module 140.

Networking modules 140*a* and 140*b* may be separate components from interface 102, but need not be. For convenience, network interface may not be shown separately, and the functions and features thereof as described herein may be performed by networking modules 140*a* and 140*b*. However, it will be appreciated that when describing data flow paths to, from, and through networking modules 140*a* and 140*b*, these may be performed by interface 102. In like manner, any of the processing performed by features illustrated as sub-components of networking module 140, for example the functionality of loopback module 135, ingress classification module 120, and/or egress classification module 130 may be performed by interface 102 (shown in FIG. 2).

In FIGS. 8A through 12B, data flows are represented by lines with arrows. A solid line indicates a data flow including a test packet. A dashed line indicates a data flow without a test packet. LAG is also illustrated. When an ellipse joins two data flows entering ports 190, it will be understood that those ports may be 0:N LAG. For 1:1 LAG, a port may be designated as "active" or "backup."

Figure 8A:
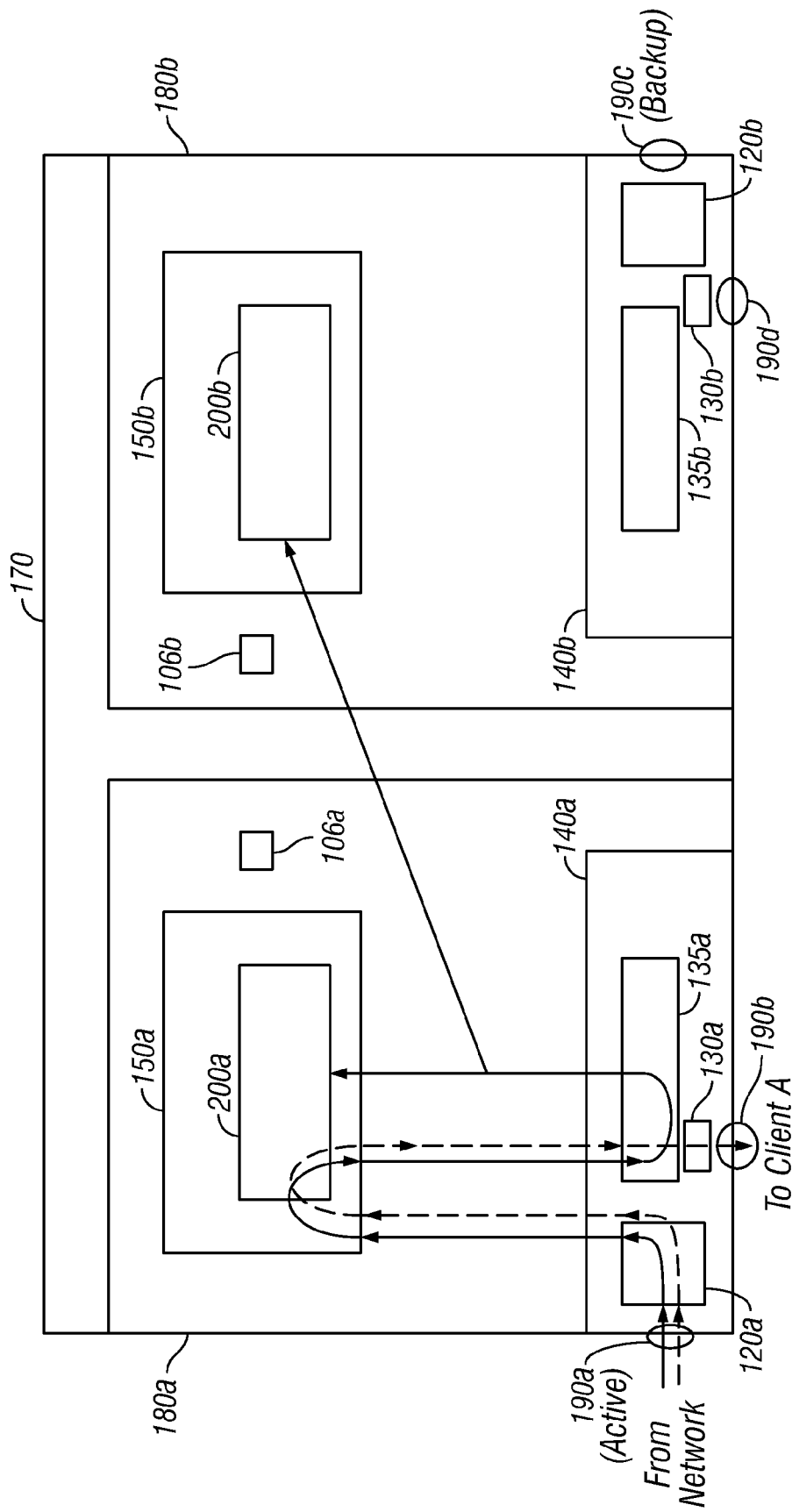
FIG. 8A illustrates an example system for handling test packets.

FIG. 8A illustrates an example system of handling test packets. A data flow including at least one test packet (illustrated as a solid line) and a data flow without a test packet (illustrated as a dashed line) are received at networking module 140a. Ingress classification module 120a performs initial processing and routes both data flows to traffic manager module 150a and test packet handler 200a. Test packet handler 200a recognizes the test packet and marks the test packet to be looped back through the system. This may be done, for example, by modifying, writing, or removing meta-tags or meta-data information. Other means of identification are also envisioned within the scope of this disclosure. Traffic manager module 150a recognizes that the data flow without a test packet is directed to client A and routes both data flows to networking module 140a. The data flow without the test packet is sent via networking module 140a to egress classification module 130a to be sent to client A. However, the data flow including the test packet is looped back towards test packet handler 200a by loopback module 135a. Thus, the test packet experiences the same or similar processing and routing as the parallel data flow that does not contain a test packet.

When the data flow including the test packet is looped back, it is sent to test packet handler 200b via backplane 170, as well as to test packet handler 200a. Based on the status of the bits in register 106a and/or 106b and the type information of the test packet, only one of test packet handler 200a and 200b will actually handle the test packet. For example, in the embodiment illustrated in FIG. 8A, for a test packet configured to analyze data flow paths that eventually go to client A, the type information may designate the test packet and associated data flow as Type One, meaning the flow is specifically associated with client A. As the test packet and associated data flow are Type One, register 106a indicates that test packet handler 200a handles this test packet. In contrast, register 106b would indicate that test packet handler 200b does not handle this test packet. Thus, even though both test packet handlers are sent the test packet, only one of them is configured to handle that particular test packet based on the type information. Alternatively, if the test packet and associated data flow is Type Three, registers 106a and 106b might again have indicated that unit 180a was to handle the packet and unit 180b was not to handle the test packet.

FIG. 8A illustrates an embodiment of 1:1 LAG across units 180a and 180b on the network side and no LAG across the units on the client side. Further, port 190a of unit 180a is shown to be active for 1:1 LAG on the network side.

Figure 8B:
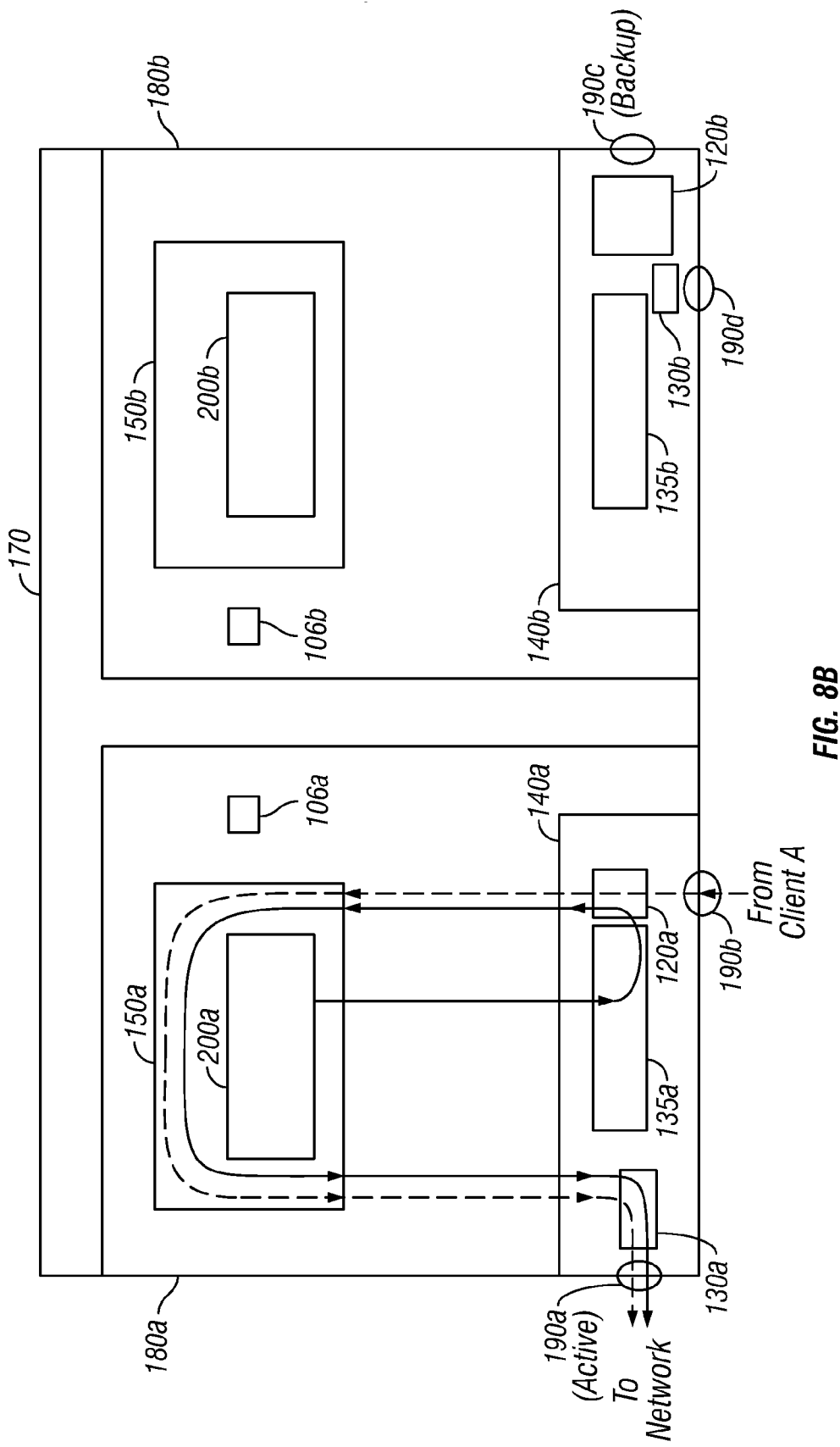
FIG. 8B illustrates an example system for handling test packets.

FIG. 8B illustrates a similar embodiment to that shown in FIG. 8A, but depicts transmitting a test packet that is analyzing a data flow originating at client A. In this embodiment, test packet handler 200a generates a test packet that is sent to networking module 140a. Loopback module 135a recognizes the test packet, for example, by destination, and loops it back to ingress classification module 120a where it joins the incoming data flow without a test packet, and both are routed to traffic manager module 150a. In this way, both the data flow including the test packet and the data flow from client A follow a parallel path from networking module 140a to traffic manager module 150a. Traffic is fed thru ingress classification module 120a on ingress, which designates a specific destination port of LAG ports for transmission to the network. This selection is then attached to the packet, which is then read by the traffic manager to route the flow to egress classification module 130a to be passed to the active port 190a. This process occurs as described herein such that the test packet experiences the same or similar processing and routing in unit 180a as that experienced by the data flow from client A without the test packet.

FIG. 8B illustrates an embodiment of 1:1 LAG across units 180a and 180b on the network side and either 0:2 LAG (with data being sent via the port from Client A) or no LAG across the units on the client side. In FIGS. 8A and 8B, both receiving and generating test packets occur on unit 180a for both Type One and Type Three test packets and associated data flows. This may be beneficial in test packet handling that uses information such as a time stamp or source and destination media access control (MAC) addresses, for example, loss measurement, loss response, delay measurement, and delay response.

Figure 9:
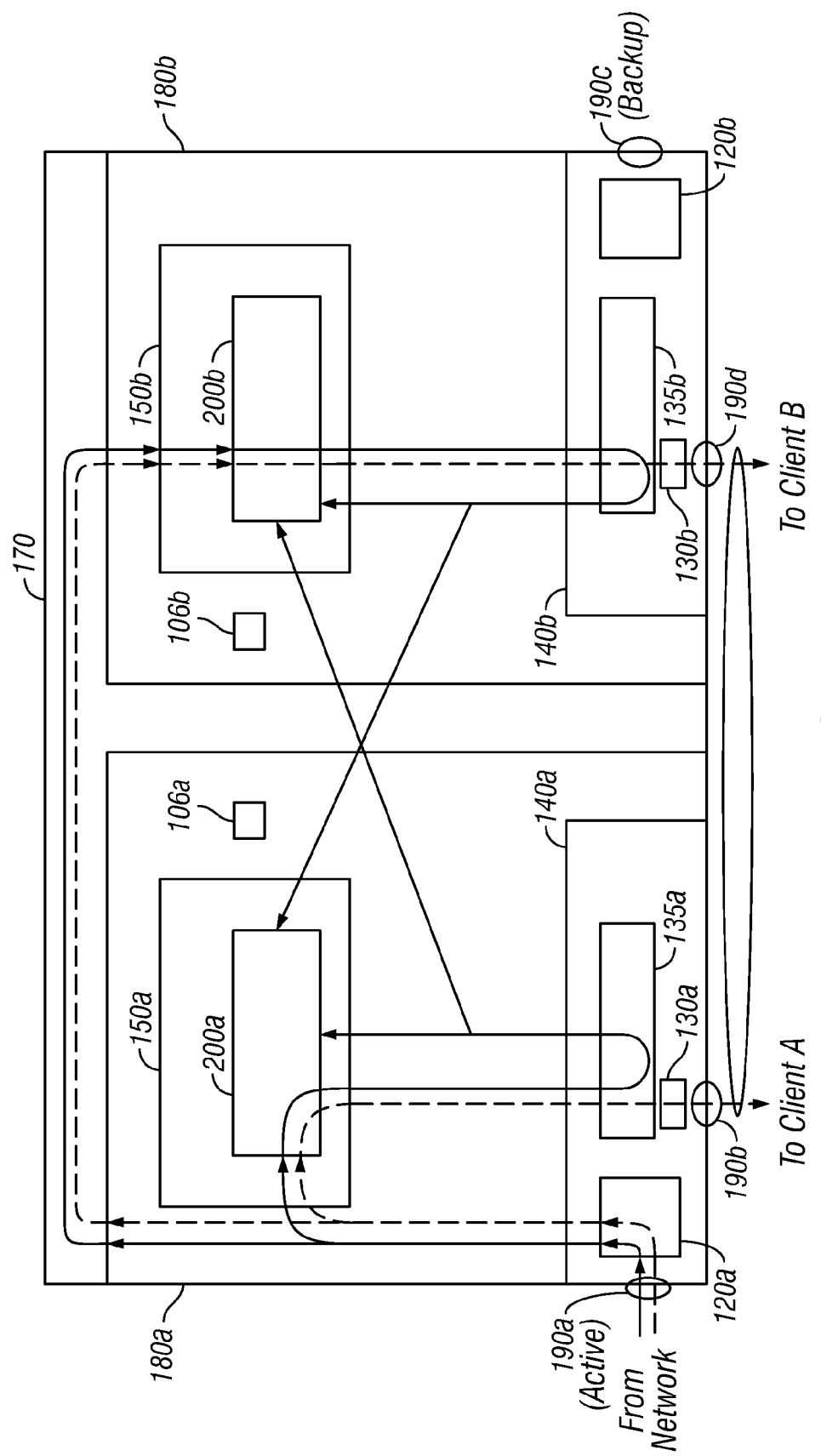
FIG. 9 illustrates an example system for handling test packets.

FIG. 9 represents another system for test packet handling. This embodiment includes data flows with a Type Three test packet. It also includes receiving a test packet associated with data flows coming in to the system from the network and ultimately going to one of client A or client B. FIG. 9 includes embodiments in which a Type Three test packet and associated data flow is handled for 1:1 LAG on the network side and 0:2 LAG on the client side. With respect to the 1:1 LAG, FIG. 9 shows unit 180a designated as the unit communicating with the network and port 190a as active. This may be designated, for example, in a trunk table. Data flows, including a data flow including a test packet, are received at unit 180a. Ingress classification module 120a analyzes and processes the data flows and routes them to traffic manager modules 150a and 150b. In some embodiments, for example in 0:N LAG, ingress classification module 120a may hash the data flows such that traffic manager modules 150a and 150b can determine whether they should process the flow or ignore the flow. For example, ingress classification module 120a may analyze an external VLAN header of a packet associated with a data flow and translate it into an internal ingress VLAN header such that traffic manager modules 150a and 150b will recognize where the data flows are directed. Depending on the ultimate destination of the data flow, one of traffic manager modules 150a and 150b will further route and/or process the flows. For example, data flows ultimately going to client A will be processed by traffic manager module 150a and data flows ultimately going to client B will be processed by traffic manager module 150b. For flows being processed by traffic manager module 150a, the processing, routing, and handling of the data flows are then nearly identical to that described in FIG. 8A, namely, the data flow without the test packet and the data flow including the test packet are sent to networking module 140a, which then directs the data flow without the test packet to egress classification module 130a and then to client A. Loopback module 135a loops the data flow including the test packet back to test packet handler 200a and 200b. As described above, for a Type Three test packet and associated data flow, unit 180a is designated in register 106a to handle Type Three flows.

Alternatively, for flows being processed by traffic manager module 150b, the flows are directed to networking module 140*b*. The data flow without the test packet is routed on to egress classification module 130*b* and then to client B. Loopback module 135*b* loops the data flow including the test packet back to both test packet handler 200*a* via backplane 170, and to test packet handler 200*b*. The bits in register 106*b* indicate that test packet handler 200*b* does not handle Type Three test packets. Register 106*a* further indicates that test packet handler 200*a* does handle Type Three test packets. Therefore, test packet handler 200*a* handles the test packet. The routing and processing of the two data flows through unit 180*b* allows the test packet to experience the same or similar processing and routing as that experienced by the data flow without the test packet. By communicating the looped back data flow to test packet handler 200*a*, it allows the same unit 180*a*, which received the data flows from the network to also handle the test packet while still experiencing the processing and routing through unit 180*b*.

Transmit test packets for Type Three packets and associated data flows are generated by test packet handler 200*a* as illustrated in FIG. 8B. This allows the receiving of test packets, as described with reference to FIG. 9, and the receiving of test packets, as described with reference to FIG. 8B, to occur on the same unit, unit 180*a*. In alternative embodiments, unit 108*b* may be designated by register 106*b* to handle the test packets. In such an embodiment, test packet handler 200*a* would be disabled by register 106*a* and test packet handler 200*b* would be enabled by register 106*b*. This may be beneficial in situations where unit 180*a* is removed, experiences hardware failure, software failure, or other errors. Alternatively, unit 180*b* may be the active unit in 1:1 LAG across the two units, in which case it may be desirable to have unit 180*b* handle Type Three test packets and associated data flows as opposed to unit 180*a*.

Figure 10A:
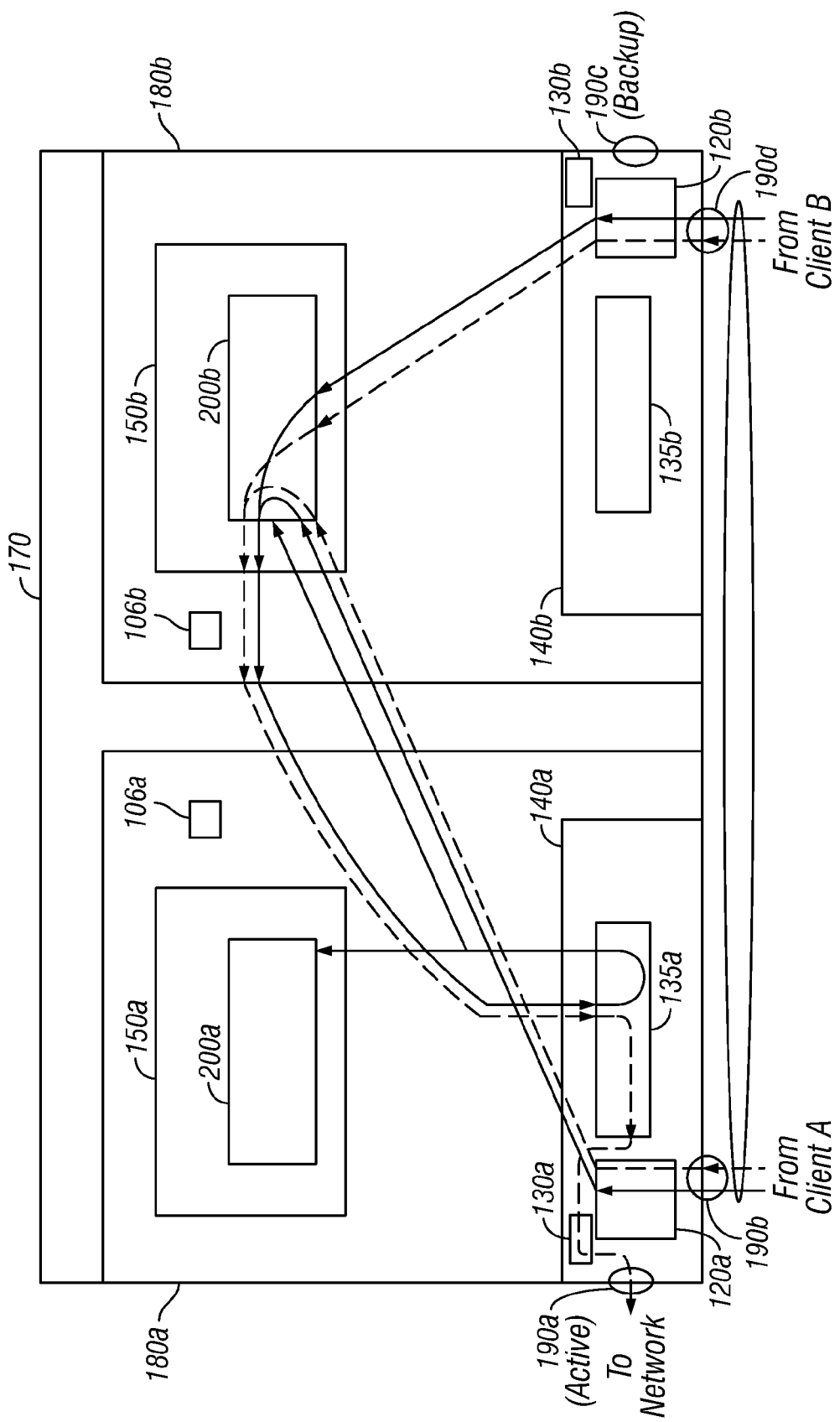
FIG. 10A illustrates an example system for handling test packets.
Figure 10B:
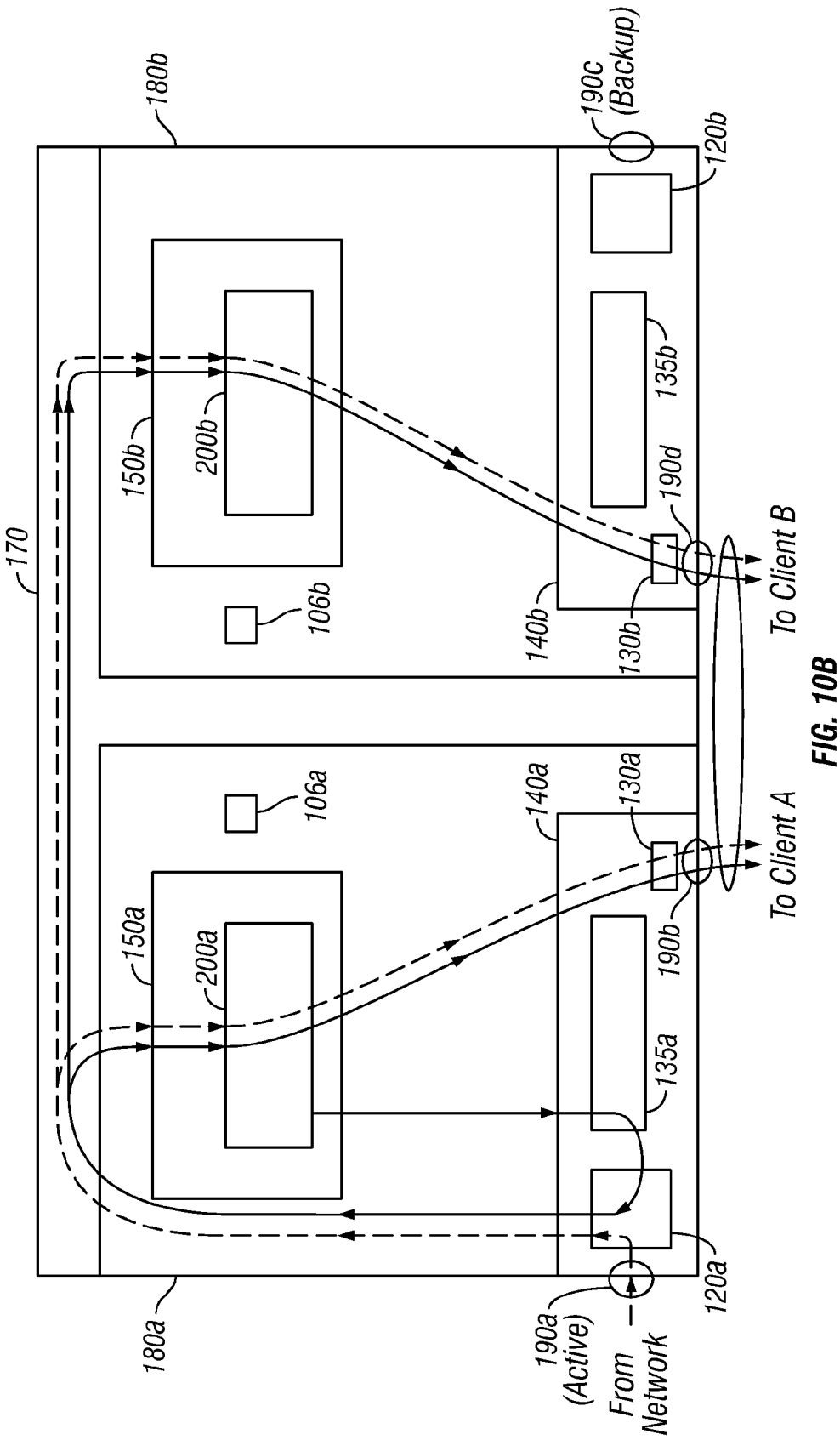
FIG. 10B illustrates an example system for handling test packets.

FIGS. 10A and 10B illustrate an example of a system for test packet handling. Additionally, they illustrate the path of Type Three test packets and associated data flows. For purposes of these illustrations, the system has 1:1 LAG on the network side across units 180*a* and 180*b*, and 0:2 LAG across the units on the client side. Register 106*a* also indicates that Type Three test packets and associated data flows are handled by unit 180*a*. With respect to the 1:1 LAG, port 190*a* is active and port 190*c* is a backup port.

With reference to FIG. 10A, a data flow including a test packet travelling parallel with a data flow without a test packet are received at either client A or client B. For example, units 180*a* and 180*b* may handle a variety of clients with different communication media. The system may be configured such that all communication from one media type are routed to traffic manager module 150*b* and all communication from another media type are routed to traffic manager module 150*a*. In some embodiments, all clients communicating with either unit 180*a* or 180*b* over copper lines may be transmitted to traffic manager module 150*b* while all clients communicating with either unit 180*a* or 180*b* over fiber lines may be transmitted to traffic manager module 150*a*. This may be accomplished by particular data in the header or other meta-tag information such that ingress classification modules 120*a* and 120*b* may appropriately route the data flows to the correct traffic manager module 150*a* or 150*b*.

As shown in FIG. 10A, the data flows are routed by ingress classification module 120*a* and 120*b* to traffic manager module 150*b*. Traffic manager module 150*b* then routes the data flows to unit 180*a* to be sent to the network. For example, traffic manager module 150*b* may route the data flows directly to networking module 140*a* and egress classification module 130*a*. The data flow with the test packet and the data flow without the test packet experience the same or similar routing and processing as they travel to traffic manager module 150*b* of unit 180*b* and then to unit 180*a* to be passed to the network. Networking module 140*a* routes the data flow without a test packet to egress classification module 130*a* prior to passing the flow to the network. Loopback module 135*a* loops the data flow including the test packet back to test packet handler 200*b* via backplane 170 and to test packet handler 200*a*. As described above, register 106*a* designates unit 180*a* to handle Type Three packets and associated data flows, thus, in this embodiment with the bits of register 106*a* set in this way, test packet handler 200*a* receives and handles the test packet rather than test packet handler 200*b*.

Alternatively, the bits could be set in register 106*b* such that unit 108*b* is active for handling Type Three flows. In such embodiments, port 190*c* may be the active port and port 190*a* may be the backup port. In such an embodiment, the data flows may still arrive at traffic manager module 150*b*. However, rather than being routed to unit 180*a* for routing to the network, the data flows are routed to networking module 140*b*. The data flow without a test packet is then routed to egress classification module 130*b* to route the flow to the network. Loopback unit 135*b* loops the data flow including the test packet back to test packet handler 200*a* via backplane 170 and to test packet handler 200*b*. However, because register 106*b* designates unit 180*b* as handling Type Three flows, test packet handler 200*b* receives and handles the test packet.

With reference to FIG. 10B, a test packet is generated at test packet handler 200*a*. This may be because register 106*a* designates unit 180*a* as handling Type Three test packets and associated data flows. For example, the data flow depicted in this embodiment originates from the network and ultimately is directed to one of the clients, so it may exist on either unit. Networking module 140*a* receives the test packet and associated data flow and loopback module 135*a* loops the data flow to ingress classification module 120*a* which then processes and routes both flows back to both units 180*a* and 180*b*. Ingress classification module 120*a* may mark the test packet with similar header information, meta-tag information, or other indicator such that it will follow the same path as the data flow arriving from the network without a test packet. The data flows then travel in parallel to both traffic manager module 150*a* and 150*b*. This may be via backplane 170. In some embodiments, based on processing of ingress classification module 120*a*, only one of traffic manager module 150*a* or 150*b* will handle the data flows. In other embodiments, the data flows may be passed through both units. In either case, it will be appreciated that the data flow containing the test packet and the data flow from the network without the test packet receive the same or similar processing and routing. Additionally, the test packets may be generated and received from the same unit, regardless of which unit receives or transmits the data flow without the test packet. For example, as shown in FIG. 10B, even though the data flow without the test packet is intended for unit 180*b*, the test packet is generated on unit 180*a*, the same unit on which the data flow without a test packet is received from the network. This allows the test packet to experience the same or similar processing and routing as the data flow without a test packet.

With reference to FIGS. 10A and 10B, it will be appreciated that by using registers 106*a* and 106*b* to indicate which unit 180 is active for handling of test packets, the same unit 180 can be utilized to both generate and receive test packets. As described above, this may be beneficial in test packet handling that may use features such as time stamps or source and destination MAC addresses, for example, loss measurement, loss response, delay measurement, and delay response.

Figure 11A:
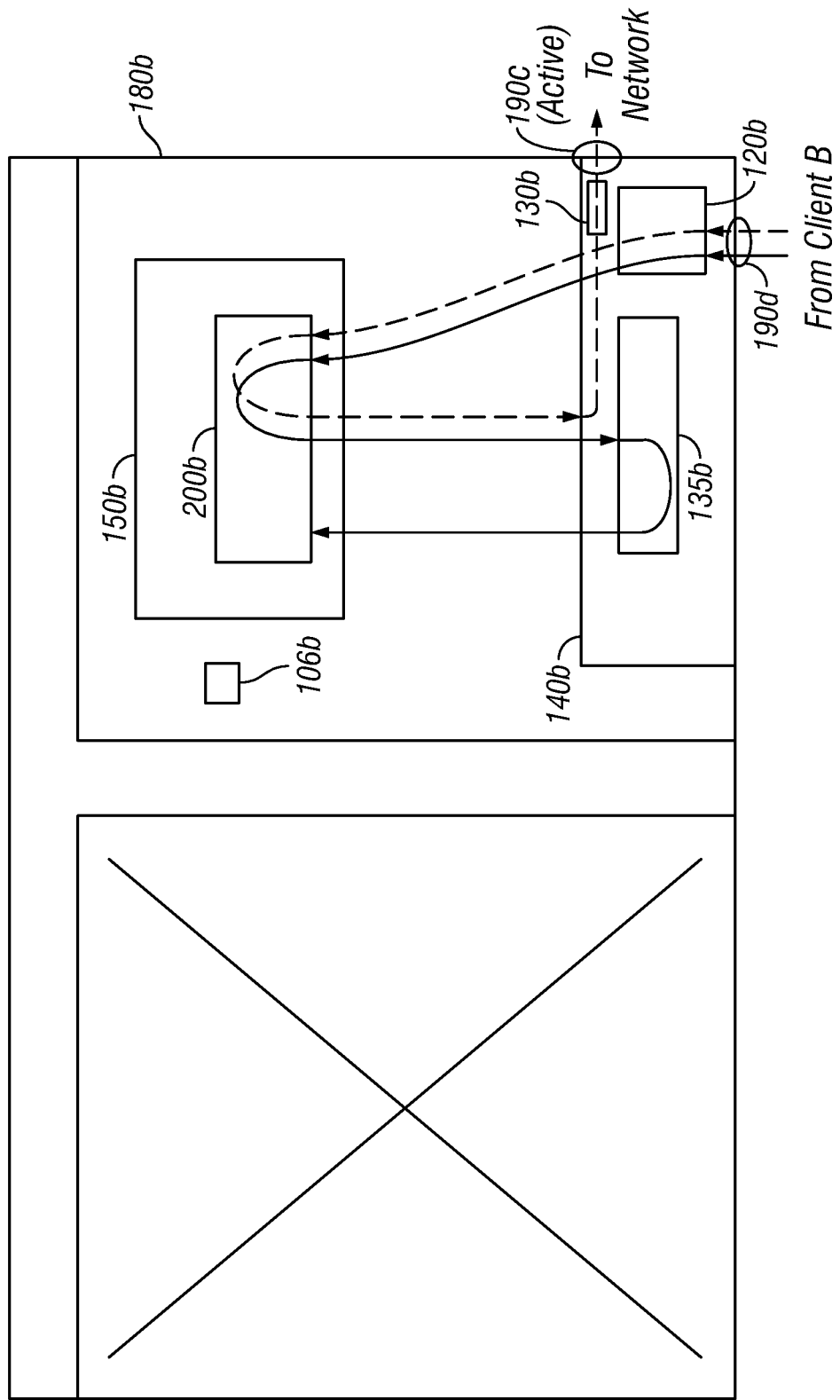
FIG. 11A illustrates an example system for handling test packets.
Figure 11B:
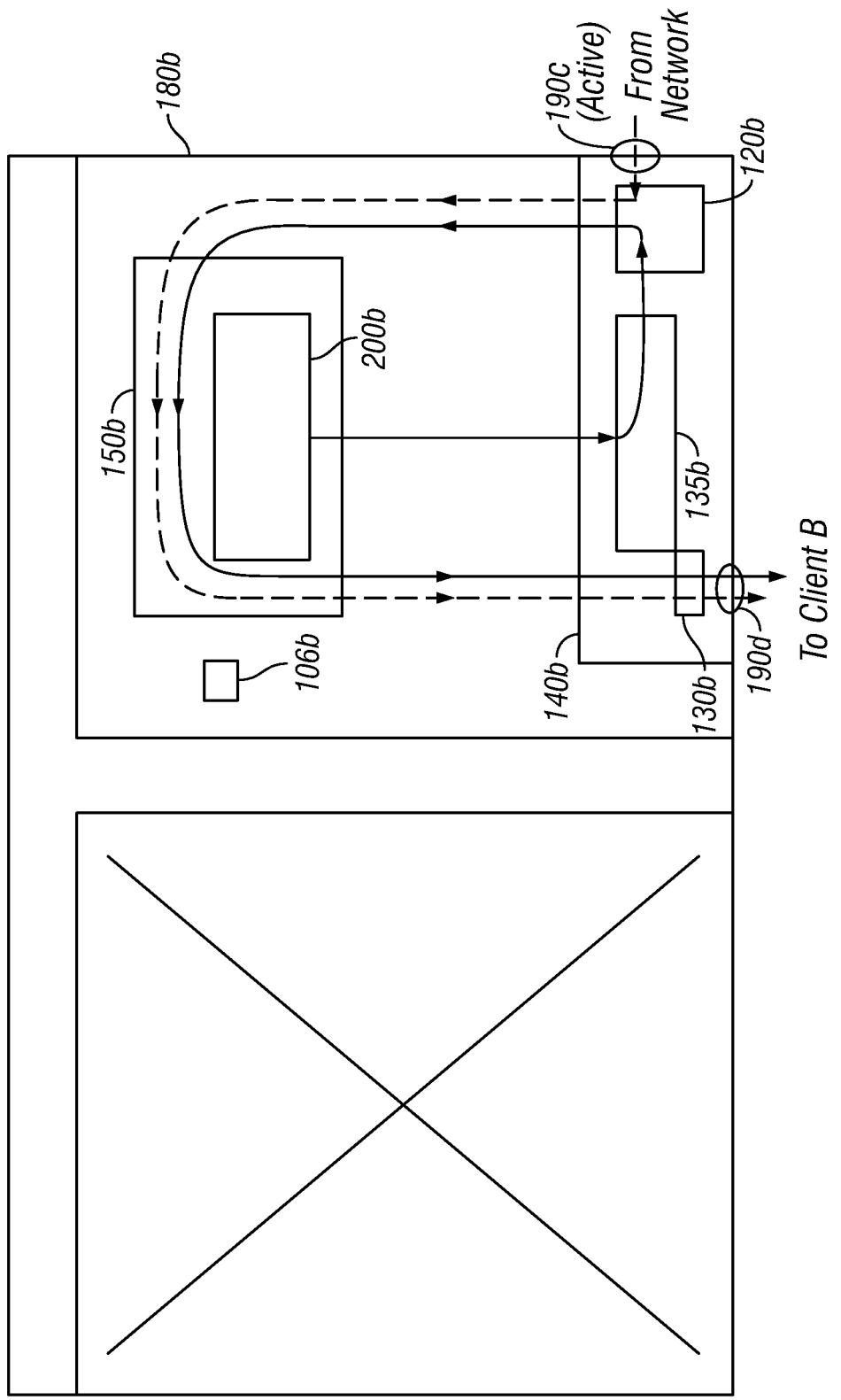
FIG. 11B illustrates an example system for handling test packets.

FIGS. 11A and 11B illustrate a similar embodiment to that illustrated in FIGS. 10A and 10B. However, in FIGS. 11A and 11B, unit 180a has been removed from the system. In such an embodiment, register 106b is modified to select unit 180b for handling of Type Three test packets and associated data flows, and is also selected in 1:1 LAG to communicate with the network. It will be appreciated that rather than a processor being required to reroute all test packets from one unit to another, the change of register 106b shifts all test packet handling of a given type to an alternative unit. This may significantly reduce processor burden in a LAG shift.

FIG. 11A illustrates receiving a test packet and associated data flow as well as a parallel data flow without a test packet from client B. Ingress classification module 120b routes these data flows to traffic manager module 150b. In some embodiments, ingress classification module 120b may perform hashing or employ a trunk table. Traffic manager module 150b routes both data flows to networking module 140b. This may be due to traffic manager module 150b reading register 106b and determining that unit 180b is designated to handle Type Three flows.

Once networking module 140b receives the data flows, it passes the data flow without a test packet to egress classification module 130b for processing and passing the flow to the network. Loopback module 135b loops the test packet and associated data flows back to test packet handler 200b. Test packet handler 200b then receives and handles the test packet. In such an embodiment, the handling of the test packet is changed to unit 180b by merely changing the bit in register 106b indicating the treatment of Type Three packets and associated data flows.

With reference to FIG. 11B, a test packet is generated at test packet handler 200b and routed to networking module 140b. Loopback module 135b loops the data flow including the test packet to ingress classification module 120b to be routed back through unit 180b. Additionally, a data flow without a test packet is received at networking module 140b. Ingress classification module 120b processes and routes both the data flow with a test packet and without a test packet in parallel to traffic manager module 150b. Traffic manager module then routes both data flows in parallel to networking module 140b to be processed by egress classification module 130b and communicated to client B. In this manner, the test packet and associated data flow will experience the same or similar processing and routing as the data flow without a test packet from the network.

As shown in FIGS. 11A and 11B, transitioning from unit 180a to unit 180b to handle test packets (for example when unit 180a is removed as illustrated in FIGS. 11A and 11B) only involves changing bits in register 106b to indicate which test packet handler 200 will handle test packets.

Figure 12A:
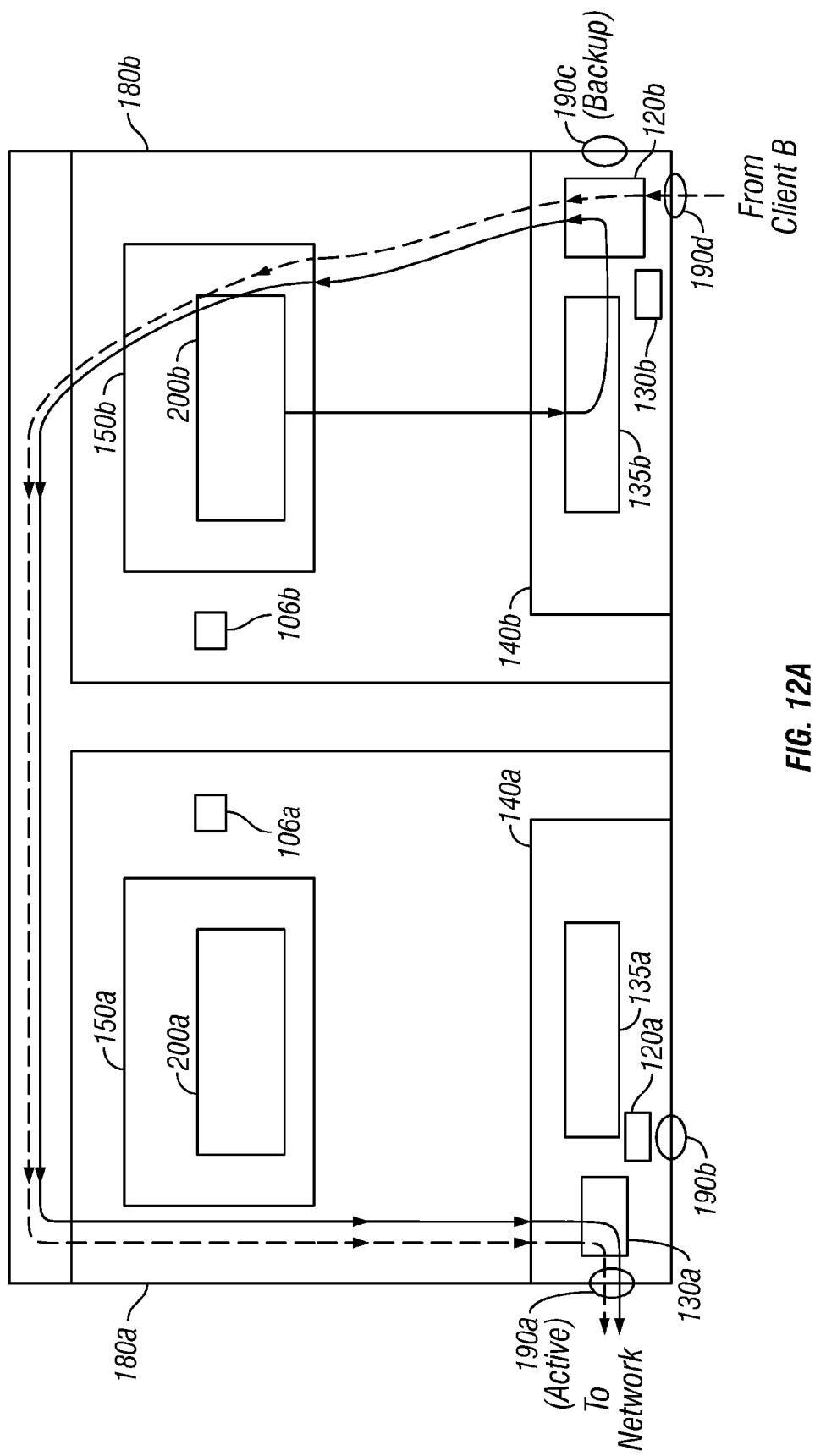
FIG. 12A illustrates an example system for handling test packets.
Figure 12B:
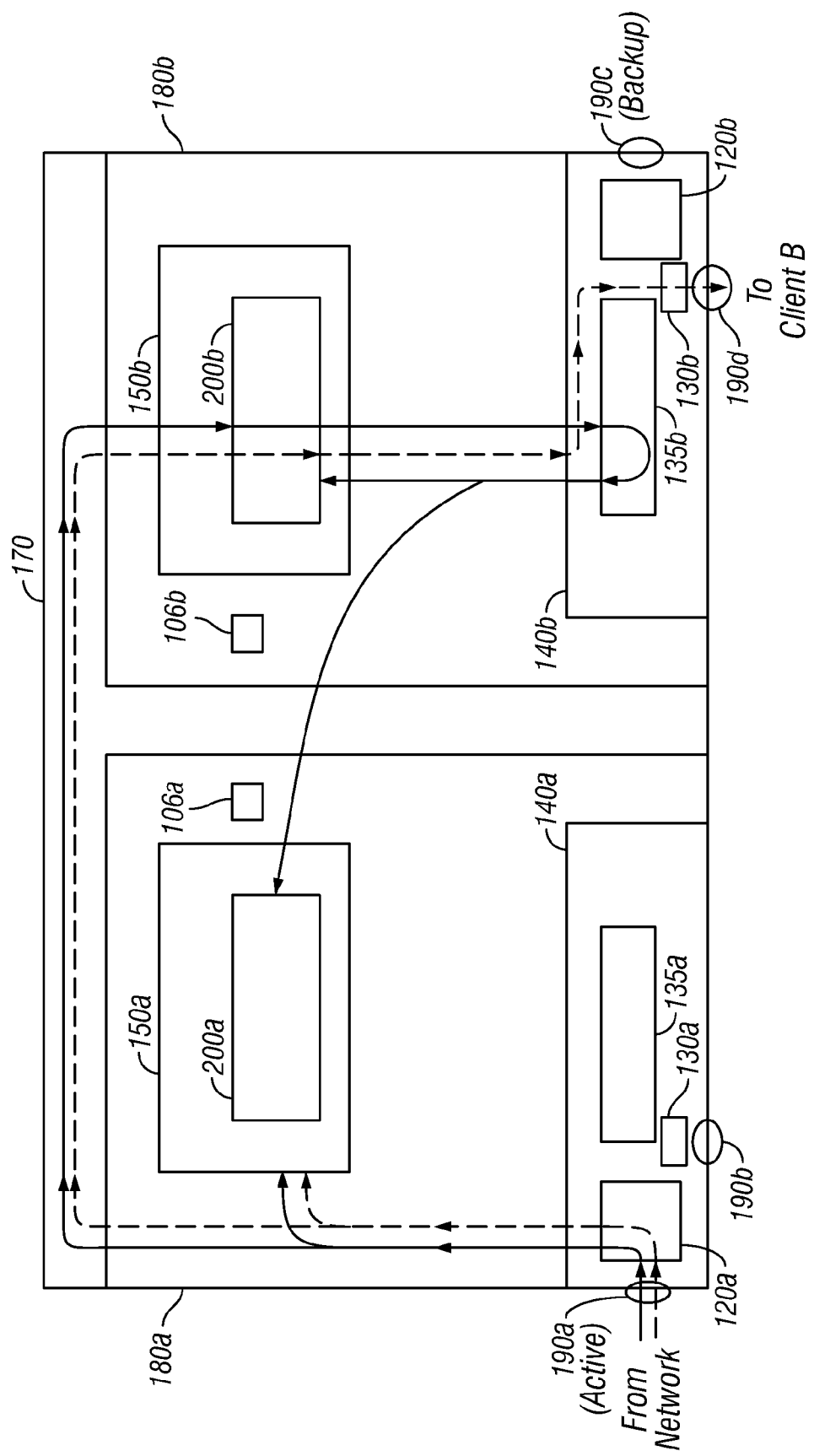
FIG. 12B illustrates an example system for handling test packets.

FIGS. 12A and 12B illustrate another example system for handling test packets. In this embodiment, units 180a and 180b may be 1:1 LAG on the network side and non-LAG on the client side. In such an embodiment, test packets and associated data flows would be designated as Type Two. Additionally, register 106b may indicate that unit 180b handles Type Two test packets.

As shown in FIG. 12A, a test packet may be generated at test packet handler 200b and routed to networking module 140b. Loopback module 136b loops the test packet to ingress classification module 120b to be routed back up through unit 180b. Networking module 140b also receives a data flow without a test packet from client B. The two data flows, both the flow containing the test packet and the flow without the test packet, are processed and routed in parallel by ingress classification module 120b. The flows are routed from networking module 140b to traffic manager module 150b. Traffic manager module 150b then routes the two flows to unit 180a to be passed to the network, presuming port 190a of unit 180a is designated as the active port for the 1:1 LAG. This may occur via traffic manager 150b which routes the flows to unit 180a for passing to the network as port 190a is the active port. Egress classification module 130a may then process the two data flows to be passed to the network. In this manner, the Type Two test packet and its associated flow may experience the same or similar routing and processing as the data flow from client B. In this embodiment, if unit 180a were to be removed for maintenance, experience a hardware failure, software failure, or some other error, the routing for all of the Type Two packets may be modified by changing the trunk table.

As shown in FIG. 12B, a test packet and its associated data flow may be received in parallel with a data flow without a test packet at networking module 140a of unit 180a. Ingress classification module 120a may process the two data flows and direct them to traffic manager modules 150a and 150b. However, only traffic manager module 150b will receive and process the two flows. Both flows will be routed by traffic manager module 150b to networking module 140b. Networking module 140b will then route the data flow without a test packet to egress classification module 130b for processing and routing to client B. Loopback module 135b will loop the test packet and associated data flow back to test packet handler 200a via backplane 170 and test packet handler 200b. However, as the test packet is a Type Two packet, only test packet handler 200b will handle the test packet. In such an embodiment, the test packet and its associated data flow experience the same or similar processing and routing as that experienced by the data flow without a test packet. In this way, both originating and receiving Type Two test packets occurs on unit 180b.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 104, one or more portions of memory 110, one or more portions of ingress classification module 120, one or more portions of egress classification module 130, one or more portions of traffic manager module 150, one or more portions of register 106, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Various embodiments disclosed herein may be used together in a variety of combinations. In various embodiments, networking device 100 may have different types, numbers, and configurations of interface 102, processor 104, register 106, memory 110, ingress classification module 120, egress classification module 130, and/or traffic manager module 150. For example, networking device may utilize different types of test packet handler 200 concurrently, and any of these test packet handlers 200 may be a separate component configured to communicate with networking device 100 or may be incorporated into networking device 100. Furthermore, the functionality of networking device 100 may be implemented using any number and types of hardware and/or software. For example, some embodiments may utilize three engines as described above in reference to FIG. 4A, while others may utilize more, fewer, or none at all. Furthermore, any such engines may be implemented with hardware, software, or any combination thereof.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A computer-implemented method of handling test packets in a networking node with a first unit communicatively coupled with a second unit, comprising:
   the networking node designating a test packet with type information, the type information indicating whether the test packet is handled by the first unit, the second unit, or either unit;
   the networking node setting one or more bits of a register of the first unit to select whether the first unit will handle all of the test packets with type information designating either unit;
   receiving the test packet at the first unit or the second unit; and
   looping the test packet through the first and second units via a backplane prior to terminally receiving the test packet at a test packet handler of the first or second unit, wherein terminally receiving the test packet at a test packet handler of the first or second unit is based at least on the one or more bits in the register.

2. The computer-implemented method of claim 1, further comprising:
   receiving a data flow at the first unit or the second unit;
   wherein the test packet is configured to be used in an Up maintenance entity group end point (MEP) application such that the test packet experiences similar routing and processing within the first and second units as the data flow.

3. The computer-implemented method of claim 2 wherein the test packet is configured to provide information in an Up MEP service aware operations, administration, and management (SOAM) application.

4. The computer-implemented method of claim 1, further comprising:
   receiving at the networking node, a data flow to be processed and routed in the first or second units;
   originating the test packet; and
   looping the test packet back through the first or second units such that the test packet experiences similar routing and processing within the networking node as the data flow.

5. The computer-implemented method of claim 1, further comprising:
   changing the one or more bits in response to removing or inserting one of the first and second units from the networking node;
   wherein ports of the first and the second units are link aggregated (LAG).

6. The computer-implemented method of claim 1, wherein ports of the first and second units are 1:1 LAG for ports in communication with a network.

7. The computer-implemented method of claim 1, wherein ports of the first and the second units are 0:N LAG for ports in communication with a client.

8. A first unit comprising:
   a register;
   a processor; and
   a non-transitory computer readable medium containing instructions that, when executed by the processor:
      designate a test packet with type information, the type information indicating whether the test packet is handled by the first unit, a second unit, or either unit;
      set one or more bits in the register to select whether the first unit will handle all of the test packets with type information designating either unit;
   wherein the first unit is communicatively coupled to the second unit; and
   when a test packet is received a the first unit or second unit, loop the test packet back through the first and second units via a backplane prior to terminally receiving the test packet at a test packet handler of the first or second units, wherein terminally receiving the test packet at a test packet handler of the first or second units is based at least on the one or more bits in the register.

9. The first unit of claim 8 wherein the first unit is configured to receive a data flow and wherein the test packet is configured to be used in an Up maintenance entity group end point (MEP) application such that the test packet experiences similar routing and processing within the first and second units as the data flow.

10. The first unit of claim 9 wherein the test packet is configured to be used in an Up MEP service aware operations, administration, and management (SOAM) data flow.

11. The first unit of claim 8, further comprising:
   a test packet handler configured to originate the test packet; and
   a loopback module configured to loop the test packet back through the first unit such that the test packet experiences similar routing and processing within the first and second units as a data flow received at the first unit.

12. The first unit of claim 8, wherein ports of the first and the second units are link aggregated (LAG) and changing the one or more bits occurs in response to removing or inserting one of the first and the second units.

13. The first unit of claim 8, wherein the ports of the first and the second units are one of 1:1, 0:2, or 0:N LAG.

* * * * *